United States Patent

[11] 3,581,016

[72] Inventors Saverio Martinelli;
Giorgio De Varda, both of Milan, Italy

[21] Appl. No. 802,486
[22] Filed Feb. 26, 1969
[45] Patented May 25, 1971
[73] Assignee Societa Italiana Telecommunicazioni Siemens S.p.A. Milan, Italy
[32] Priority Feb. 26, 1968
[33] Italy
[31] 13197-A/68

[54] TIME-SHARING TELECOMMUNICATION SYSTEM

11 Claims, 14 Drawing Figs.

[52] U.S. Cl. .......... 179/15AT
[51] Int. Cl. .......... H04j 3/00
[50] Field of Search .......... 340/172.5; 179/15 SYNC, 15 T, 15 ATI, 15 AL, 15 AT

[56] References Cited

UNITED STATES PATENTS

| | | | |
|---|---|---|---|
| 3,171,896 | 3/1965 | Bartlett etal. | 179/15(AT) |
| 3,302,182 | 1/1967 | Lynch et al. | 340/172.5 |
| 3,305,641 | 2/1967 | Von Sanden et al. | 179/15(AT) |
| 3,308,240 | 3/1967 | Von Sanden | 179/15(AT) |
| 3,271,521 | 9/1966 | Von Sanden | 179/15(AT) |

*Primary Examiner*—Kathleen H. Claffy
*Assistant Examiner*—David L. Stewart
*Attorney*—Karl F. Ross

ABSTRACT: A telephone exchange serving subscriber and trunk lines on a time-sharing basis has three circulating memories operating in synchronism, the operating cycle of each memory representing a frame of 100 phases or time slots serving for the registration of the number of a calling party in a phase of the first memory (100), the number of a called party in a corresponding phase of the second memory (200) and information on the progress of a call between the two parties in the same phase of the third memory (300). The second time slot (phase $\Phi_2$) of the second memory (200) is utilized as a binary counter successively registering, during consecutive frames, the addresses or call numbers of all lines served by the exchange. Each address thus inscribed is entered, one frame later, in a buffer register (800) for the duration of the following frame; concurrently, the line switches of the station identified by that address are briefly closed to sample the line voltage for the presence or absence of loop current. Special provisions are made for the calling of an outgoing trunk identified by a first digit "O" in its three-digit address. Other phases ($\Phi_1$, $\Phi_3$, $\Phi_4$) at the beginning of each frame are utilized for the automatic checking of the equipment, with instant substitution of a standby memory (500) for the monitoring memory (300) or for any one of the three digital sections of either address memory (100, 200), designed as identical modules, if such module is found to be defective.

INVENTORS,
SAVERIO MARTINELLI
GIORGIO DE VARDA
BY

Karl F. Ross
ATTORNEY

TO FIG. 6

INVENTORS.
SAVERIO MARTINELLI
GIORGIO DE VARDA
BY Karl F. Ross
ATTORNEY

INVENTORS
SAVERIO MARTINELLI
GIORGIO DE VARDA
BY Karl F. Ross
ATTORNEY

INVENTORS,
SAVERIO MARTINELLI
GIORGIO DE VARDA
BY
Karl F. Ross
ATTORNEY

INVENTORS
SAVERIO MARTINELLI
GIORGIO DE VARDA
BY
Karl F. Ross
ATTORNEY

INVENTORS.
SAVERIO MARTINELLI
GIORGIO DE VARDA
BY
Karl F. Ross
ATTORNEY

PATENTED MAY 25 1971

3,581,016

SHEET 08 OF 11

INVENTORS,
SAVERIO MARTINELLI
GIORGIO DE VARDA
BY
Karl F. Ross
ATTORNEY

INVENTORS,
SAVERIO MARTINELLI
GIORGIO DE VARDA
BY
*Karl F. Ross*
ATTORNEY

INVENTORS,
SAVERIO MARTINELLI
GIORGIO DE VARDA
BY
Karl F. Ross
ATTORNEY

INVENTORS,
SAVERIO MARTINELLI
GIORGIO DE VARDA
BY
Karl F. Ross
ATTORNEY

TIME-SHARING TELECOMMUNICATION SYSTEM

Our present invention relates to a telecommunication system of the time-sharing type in which a common signaling channel is used for the concurrent transmission, in interleaved relationship, of message samples relating to different communications between a multiplicity of calling stations and a like number of called stations.

In time-allocation telephone systems, for example, voice frequencies of up to several thousand kc. may be periodically sampled by pulses having a duration of about 1 microsecond. With the recurrence rate or cadence of these sampling pulses equal to at least twice the highest voice frequency to be transmitted, 100 or more messages can be simultaneously exchanged over a common signal path. To this end it is merely necessary that the lines of a calling and a called station communicating with each other, be they local subscriber lines or long-distance trunk lines, be simultaneously connected to the signal path during the same phase of a scanning cycle, i.e. during a time slot of, say, 1 $\mu$sec. recurring as a phase of a 100-phase frame of, say, 100 $\mu$sec. Thus, the common signal path may be subdivided into about 100 communication channels adapted to be individually allotted, for the duration of a call, to a pair of intercommunicating stations.

The general object of our present invention is to provide fully electronic means in such a system for automatically allocating an available time slot to a calling station and extending the connection to a called station sampled within the same time slot, all without electromagnetic relays or other movable elements subject to wear and consequent malfunction.

Another object of this invention is to provide means for continuously monitoring the performance of at least the more sensitive parts of electronic time-allocation equipment and instantly detecting any significant deviation of their operation from prescribed standards.

A further object, allied with the preceding one, is to provide means for immediately and automatically substituting a standby unit for a component found to be defective.

In commonly assigned copending application Ser. No. 735,606, filed by us jointly with Aldo Perna on June 10, 1968, we have disclosed a circulating memory adapted to be used as a temporary register for a multiplicity of binary codes or "-words" which are periodically reproduced, in cyclic succession, to serve as switching signals in a time-sharing telecommunication system of the type herein referred to. Each of the stored words is reproduced at the output end of a set of parallel delay lines after a predetermined storage interval and is then reinscribed for recirculation unless modified, canceled or replaced under the control of an input signal. A control pulse applied to one of several input terminals may increase or decrease the numerical value of the recirculated word by one unit, may erase that word, may substitute the digit "1" for the word or may replace it with any specific combination of bits from an external source. A set of four parallel delay lines (advantageously of the magnetostrictive-type) enables the continuous recirculation of up to 100 4-bit codes per operating cycle if the latter has a duration of 100 $\mu$sec.

In accordance with a feature of our present invention, we utilize a plurality of circulating memories of the aforedescribed type for the purpose of:

a. consecutively storing the identification numbers of all the lines terminating at a given exchange within a period, generally equal to a fraction of a second, in which a change in line voltage (due, for example, to the closure of a hook switch of a calling subscriber) is to be detected;
b. registering, within an available time slot or phase, the identification number or address of a station initiating a call, as determined by the periodic testing of all the incoming lines pursuant to (a); and
c. registering, in the same time slot or phase, the address of a station dialed or otherwise selected by the calling subscriber registered pursuant to (b).

A further use for such a circulating memory arises within an evaluating unit which, apart from ascertaining the onhook or offhook condition of a line being sampled, detects the dialing pulses transmitted by the calling subscriber and retransmits them, together with an end-of-digit signal after each pulse train, to a logic network serving for the inscription of the identity of a called station (local subscriber or remote terminal of a trunk line) on the memory carrying out the function (b). Reference in this connection may be made to our copending application Ser. No. 676,135, filed Oct. 18, 1967, and to the corresponding commonly owned Italian Pat. No. 760,783.

One of these memories, serving for the periodic testing of the lines, is progressively stepped by a pulse recurring once per operating cycle, the duration of this cycle (e.g. of 100 $\mu$sec.) being the same for all the circulating memories. With 1000 lines terminating at the exchange, for example, this memory reproduces the addresses of all these lines ten times per second.

Since this operation requires only one time slot per frame or memory cycle, the memory used for testing the lines may be one of the address memories carrying out function (b) or (c), preferably the latter. Even with some other time slots reserved for special service purposes, as described hereinafter, this still leaves well over 90 time slots available for as many different conversations to be carried out concurrently over the same signal path.

The two address memories serving to store the identities of the calling and called stations involved in an incipient or ongoing conversation, hereinafter referred to as the caller memory and the responder memory, may each be subdivided into as many sections as there are digits in the identification number of any station, i.e. three sections of four delay lines each for a central office serving up to 1000 lines.

In accordance with another feature of our invention, a monitoring memory of the same general construction (but usually limited to a single four-stage section) operates in synchronism with the caller and responder memories to store coded information representing the state of communication of the signal channel corresponding to any time slot of the caller memory seized by an incoming line. As the call progresses, the corresponding monitoring code is altered to prepare the system for such operations as transmission of a dial tone to the caller, detection of dialing pulses, transmission of busy signals or ringing current, and commencement of conversation. Upon the termination of a call, the corresponding time slots are cleared in all the memories involved.

In accordance with another important feature of our invention, the identification number registered in one of the address memories (e.g. the responder memory) during the test phase of any frame or memory cycle is transferred to a buffer register for storage during the communication phases which account for most or all of the remainder of the cycle. A first comparator, upon ascertaining an identity between the number stored in the buffer register and a number registered in one of the communication time slots of the caller memory, uses the corresponding time slot of the monitoring memory to register therein the state of incipient communication. After the call digits of the station wanted by the calling subscriber have been registered in the corresponding time slot of the responder memory, a second comparator checks for an identity between this digit combination and the number stored in the buffer register at some point during the testing period to determine the busy or idle condition of the called station. The same comparators intervene for the purpose of ascertaining whether an incoming line carrying loop current has just been activated for the placement of a call or already occupies a time slot in the caller memory, and whether a line selected by the caller is already engaged in another connection as determined by the presence of its number in another time slot of the responder memory.

For the operations just described, each circulating memory is preferably equipped with respective inputs for forward counting (ADD 1), setting to unity (INSCRIBE 1), resetting to zero (INSCRIBE 0) and entry of any externally supplied binary code having the proper number of bits. The input for backward counting (SUBTRACT 1), also provided in the system of the aforementioned application Ser. No. 735,606, will generally not be needed except in a more sophisticated version of the evaluation unit for the incoming switching signal as described in our copending application Ser. No. 676,135. It should be understood, however, that backward counting may be substituted for forward counting at least in the consecutive testing of the lines during one of the phases of each scanning cycle or frame.

Thus, all the circulating memories or memory sections of our present system may be made mutually identical, or substantially so, thereby a single standby memory of the same construction may be used to replace any of the active memories found to be defective. Such substitution, pursuant to still another feature of our invention, may be performed by a supervisory unit which, advantageously during one or more service phases preceding the communication phases or time slots of a memory cycle or frame, concurrently energizes corresponding inputs of a group of such memories and compares their outputs to ascertain the presence or absence of the expected identity. If these outputs differ, the supervisory unit substitutes the standby memory for the presumably defective active memory in the group.

Since the timing of the testing, sampling, stepping and transfer operations performed by our present system is extremely critical, it is desirable to provide means for promptly detecting any deviation from the proper harmonic relationship of the cadences of those pulse trains whose fundamental frequencies are to be predetermined (usually decadic) multiples or submultiples of one another, such as the basic clock pulses occurring once per time slot (e.g. every microsecond) and the service pulses generated once per scanning cycle or frame (e.g. every 100 $\mu$sec.). In practice, these decadic multiples or submultiples are produced by frequency multipliers or, more conveniently, dividers; if a frequency divider having an operating ratio of 1:10 goes awry, the denominator of its deviation ratio may vary by a whole number so as to make this ratio, in a limiting case, either 1:9 or 1:11. In order to detect this otherwise not easily recognizable departure, we prefer to provide a verification circuit which measures an interval ranging between 1:($n$−1) and 1:($n$+1) where $n$ is the factor of division, usually 10. Such a circuit, pursuant to a further feature of our invention, may comprise a pair of cascaded monostable multivibrators (monoflops) having the corresponding time constants.

The above and other features of our invention will become more fully apparent from the following detailed description of a preferred embodiment, reference being made to the accompanying drawing in which:

FIGS. 1—3 are sets of graphs serving to explain the relative timing of certain periodically recurring phenomena in a system according to the invention;

Figure 1:
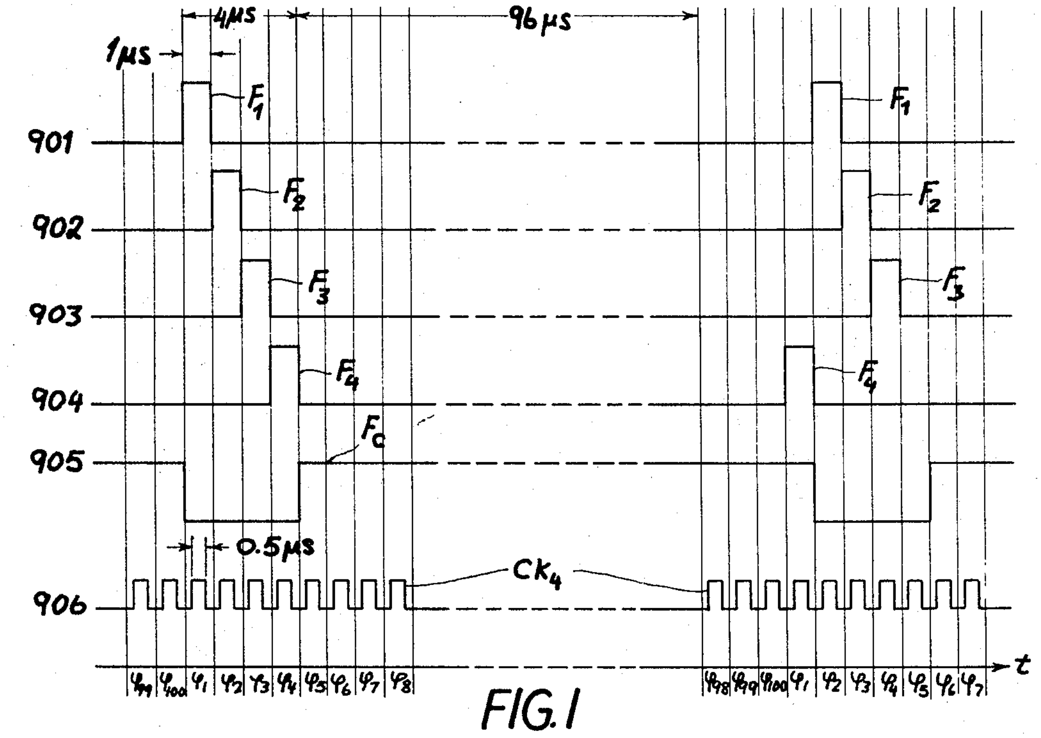
Figure 2:
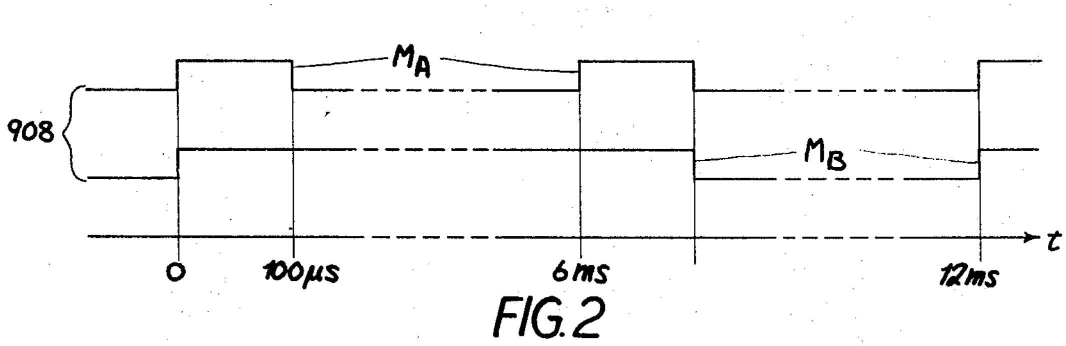
Figure 3:
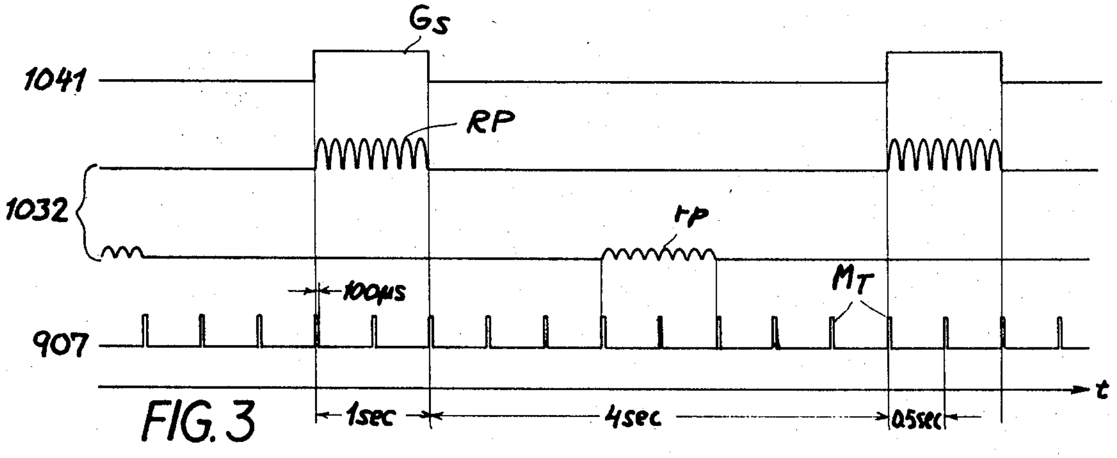

In FIGS. 1—3 we have graphically illustrated certain periodically recurring signals utilized in our present system. The basic unit of time has a duration of 1 $\mu$sec., as determined by a series of clock pulses of which the pulse train $Ck_4$ shown in FIG. 1 is representative. These pulses have a width of 0.5 $\mu$sec. and occur during respective time slots $\Phi_1$—$\Phi_{100}$, of 1 $\mu$sec. duration, a succession of 100 such time slots or phases representing a frame or an operating cycle of a circulating memory described in greater detail hereinafter. The first four time slots $\Phi_1$—$\Phi_4$ of each cycle or frame are referred to hereinafter as service phases and are not utilized for the exchange of telephone messages; the remaining 96 time slots $\Phi_{5—100}$ represent the communication phases. The two groups of phases are distinguished by a pulse $F_c$, having a width of 96 $\mu$sec. and a period of 100 $\mu$sec., which comes into existence during phases $\Phi_5$—$\Phi_{100}$. A group of service pulses $F_1$, $F_2$, $F_3$, $F_4$, recurring once per cycle, respectively coincide with time slots $\Phi_1$, $\Phi_2$, $\Phi_3$, $\Phi_4$. The width of each service pulse equals 1 $\mu$sec.

In FIG. 2 we show two further pulse trains $M_A$ (scanning) and $M_B$ (stepping). Scanning pulses $M_A$ have a width of 100 $\mu$sec. equal to a memory cycle and recur with a period equal to an exact multiple of that cycle, here assumed to be 6 ms. Stepping pulses $M_B$ recur at twice that period, i.e. 12 ms., each of them spanning two successive scanning pulses $M_A$. As explained in our copending application Ser. No. 676,135 referred to above, the scanning pulses $M_A$ permit a periodic sampling of the line voltages from all calling subscribers while the stepping pulses serve to advance a logical chronometer which may have an operating period of 16 stepping pulses $M_B$, thus of 192 ms.; short term interruptions of the line current within a predetermined interval of that operating period (e.g. between 48 and 96 ms.) are recognized as dialing impulses whereas interruptions of longer duration (e.g. in excess of 11 stepping pulses, or about 130 ms.) give rise to end-of-digit signals.

In FIG. 3 we have shown a periodic pulse $M_T$, of a width equal to 100 $\mu$sec. and a period of half a second, which is used to modify the monitoring code relating to the establishment of a connection for switching a tone generator from a first ringing signal to a succession of ringing pulses RP designed to alert a called subscriber in the conventional manner. The ringing pulses RP coincide with respective blocking pulses $G_s$ which last for one second each and recur at 5-second intervals. A low-amplitude replica $rp$ of each ringing pulse is transmitted back to the calling subscriber, as a line-free signal, during intervals between blocking pulses $G_s$ whose presence prevents the transmission of large-amplitude ringing current RP to the calling subscriber. The current pulse RP and $rp$, usually of a frequency of 25 cps., may be modulated upon a carrier of 1 kc. lying within the band of transmitted voice frequencies.

In the graphs of FIGS. 1—3 we have also included the numerical designations of various leads, described hereinafter with reference to subsequent Figures, on which the respective pulses are developed.

Figure 4:
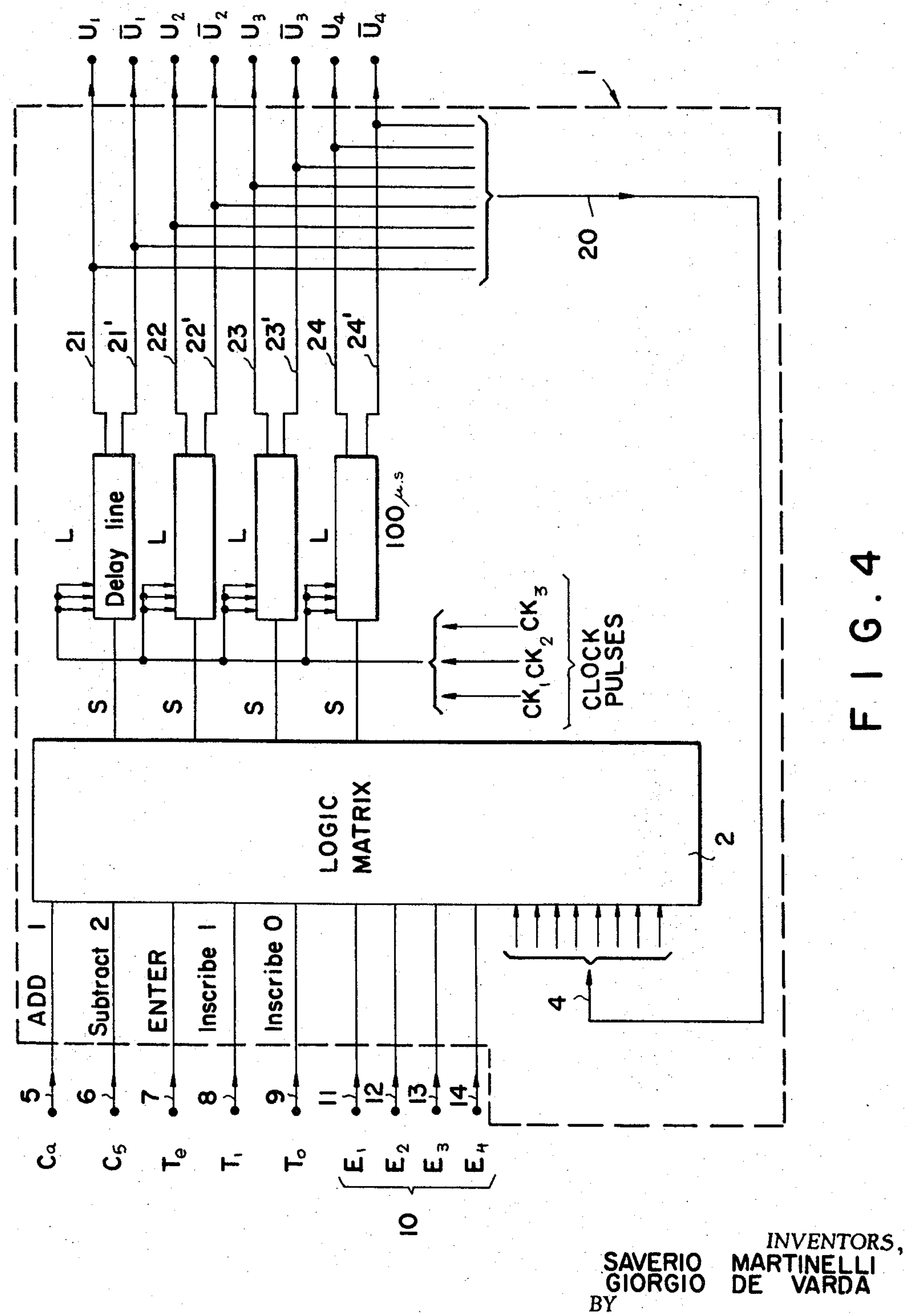
FIG. 4 is a block diagram of a circulating memory or counting register of the type disclosed in application Ser. No. 735,606, representing the prototype of several such memories shown in subsequent figures.

FIG. 4 illustrates a representative embodiment of a circulating memory used in a system according to our invention. The memory 1 shown in FIG. 4 is identical with that disclosed in the above-mentioned copending application Ser. No. 735,606 and comprises a logic matrix 2 with nine inputs and four outputs, these outputs including parallel delay lines $L_1$, $L_2$, $L_3$, $L_4$ carrying respective bits $S_1$, $S_2$, $S_3$, $S_4$ of a succession of 4-bit binary words. These delay lines may be constituted by magnetostrictive wires on which a pulse $S_1$—$S_4$, of a width less than 0.1 $\mu$sec. travels for 100 $\mu$sec. until reaching a conductor 21, 22, 23 or 24 as an output pulse $U_1$, $U_2$, $U_3$ or $U_4$. A set of four companion conductors 21', 22', 23', 24' are energized in the absence of such a pulse to carry an output $\overline{U}_1$, $\overline{U}_2$, $\overline{U}_3$ or $\overline{U}_4$. From these output conductors, collectively designated 20, branches extend to a set of feedback leads 4.

The nine inputs of matrix 2 have been designated 5 for a signal $C_a$ (ADD 1), 6 for a signal $C_s$ (SUBTRACT 1), 7 for a signal $T_e$ (ENTER), 8 for a signal $T_1$ (INSCRIBE 1), 9 for a signal $T_0$ (INSCRIBE O), and 11—14 (collectively labeled 10) for the entry of respective bits of a new binary word upon concurrent energization of input 7. A word circulating in delay lines $L_1$—$L_4$, upon being fed back to matrix 2, is recirculated unchanged if none of the inputs 5—9 is energized. In the presence of a signal $C$ the numerical value of the word is increased by 1; in the presence of a signal $C_s$ on lead 6 this value is correspondingly decreased. A signal $T_1$ on lead 8 replaces the circulating word by the binary code 0001 (energization of output conductors 21, 22′, 23′, 24′) whereas a signal $T_0$ on lead 9 cancels the existing word to energize the output conductors 21′, 22′, 23′, 24′ (code 0000).

Thus, the memory 1 of FIG. 4 is able to carry, at any one instant, up to 100 code words which can be individually canceled, modified or replaced at 100-μsec. intervals. The internal connections of the logic matrix 2, fully illustrated in our copending application, are such that the pulses $S_1$—$S_4$ satisfy the following logical equations:

$$S_1 = (\bar{U}_1 C_a \bar{T}_e + \bar{U}_1 C_s \bar{T}_e + E_1 T_e + T_1 + U_1 \bar{C}_a \bar{C}_s \bar{T}_e) \bar{T}_o \quad (1)$$

$$S_2 = [(U_1 \bar{U}_2 + \bar{U}_1 U_2) C_a \bar{T}_e + (\bar{U}_1 \bar{U}_2 + U_1 U_2) C_s \bar{T}_e + E_2 T_e + U_2 \bar{C}_a \bar{C}_s \bar{T}_e] \bar{T}_o \bar{T}_1 \quad (2)$$

$$S_3 = [(U_1 U_2 \bar{U}_3 + \bar{U}_1 U_3 + \bar{U}_2 U_3) C_a \bar{T}_e + (\bar{U}_1 \bar{U}_2 \bar{U}_3 + U_1 U_3 + U_2 U_3) C_s \bar{T}_e + E_3 T_e + U_3 \bar{C}_a \bar{C}_s \bar{T}_e] \bar{T}_o \bar{T}_1 \quad (3)$$

$$S_4 = [(U_1 U_2 U_3 \bar{U}_4 + \bar{U}_1 U_4 + \bar{U}_2 U_4 + \bar{U}_3 U_4) C_a \bar{T}_e + (\bar{U}_1 \bar{U}_2 \bar{U}_3 \bar{U}_4 + U_1 U_4 + U_2 U_4 + U_3 U_4) C_s \bar{T}_e + E_4 T_e + U_4 \bar{C}_a \bar{C}_s \bar{T}_e \bar{T}_o \bar{T}_1]. \quad (4)$$

Figure 5:
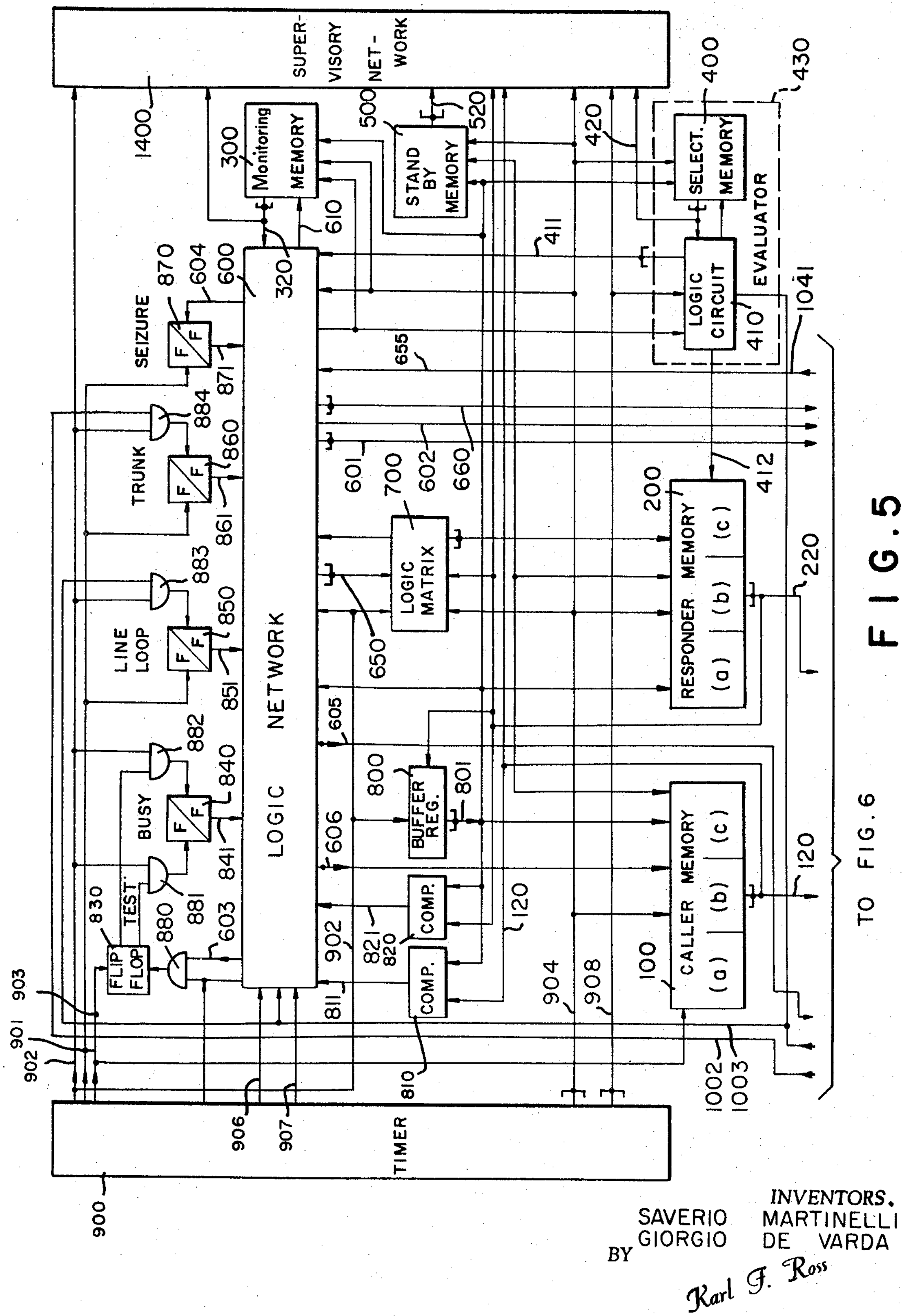
FIGS. 5 and 6 are mutually complementary views of different parts of a telephone exchange embodying our invention.
Figure 6:
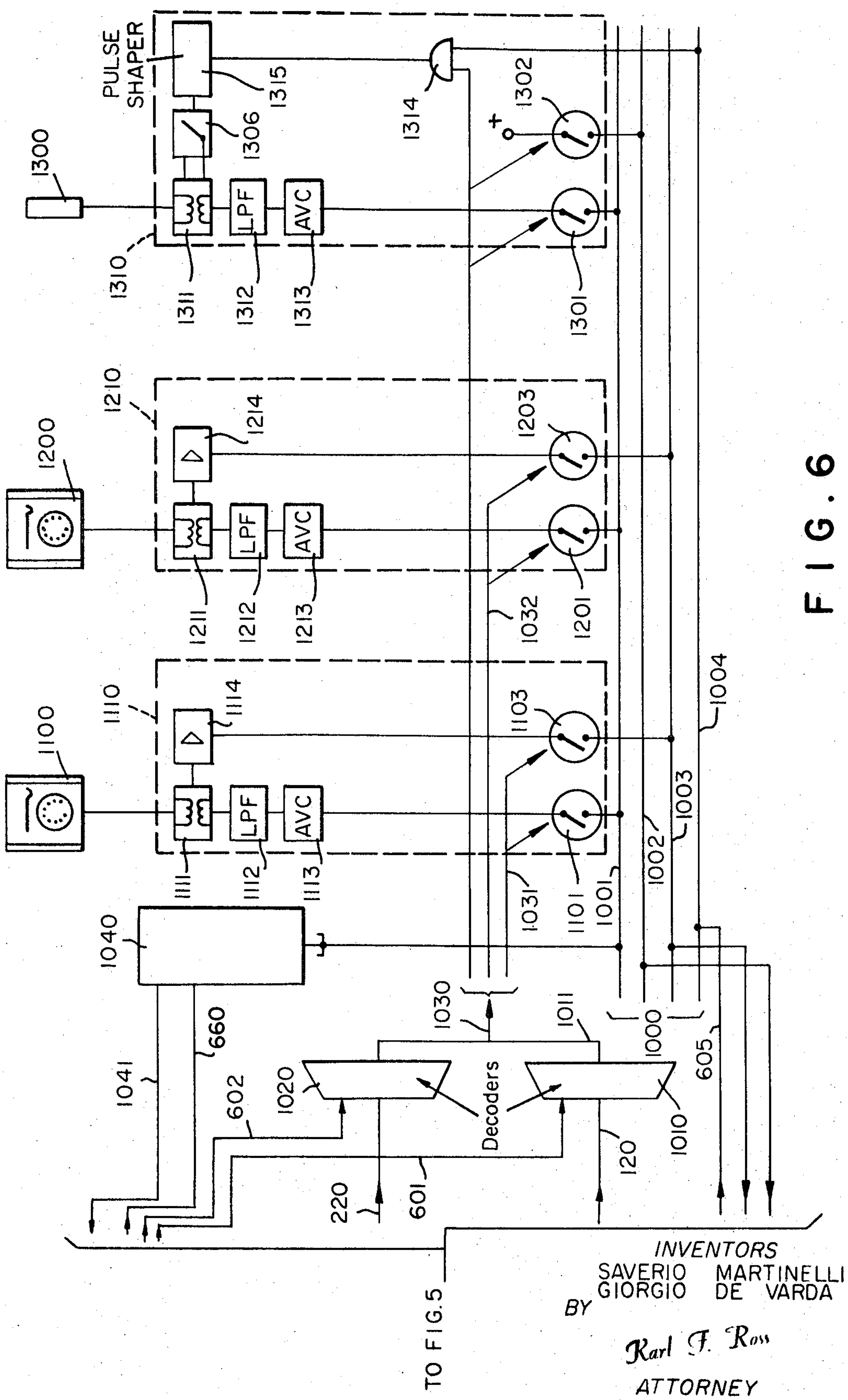

FIGS. 5 and 6, When juxtaposed in the manner indicated on their margins (bottom of FIG. 5 alongside left-hand edge of FIG. 6), represent an overall diagram of a telephone exchange embodying our invention. The exchange is assumed to serve 900 local subscriber lines, two of which are shown at 1100 and 1200 in FIG. 6, and 100 trunk lines leading to other central offices, one such trunk line being shown in FIG. 6 at 1300. The terminal equipment associated with these 1000 lines is represented by local stations 1110, 1210, 1310 each identified by an individual address of three digits in the usual decadic system. We shall further assume that the address of each trunk line has a "0" as its first digit.

The subscriber stations associated with the exchange are all identical and include, in the case of stations 1110 and 1210, respective hybrid coils 1111, 1211, low-pass filters 1112, 1212, gain-control stages 1113, 1213, threshold devices 1114, 1214 for the selective pickup of dialing pulses, and a pair of electronic switches 1101, 1201 and 1103, 1203 periodically connecting the stages 1113, 1213 and 1114, 1214 of these stations, at staggered intervals of one μsec. each, to respective wires 1001, 1003 of a transmission path 1000 common to all the stations of the exchange. Station 1310 associated with trunk line 1300 similarly comprises a hybrid coil 1311, a low-pass filter 1312 and a volume control 1313, all in series with a switch 1301 leading to wire 1001; the trunk terminal also includes an electronic switch 1302 inserted between a source of operating potential (here positive) and another wire 1002 of path 1000, an AND gate 1314 having an input connected to a further wire 1004 of that signal path and working into a pulse shaper 1315, and an electronic or electromagnetic relay 1316 adapted to short circuit the trunk side of hybrid coil 1311 under the control of the output of unit 1315.

Switches 1101 and 1103 are concurrently closed upon the energization of a lead 1031 of a multiple 1030, two other leads 1032, 1033 of the same multiple serving the switch pairs 1201, 1203 and 1301, 1302, respectively. The leads of multiple 1030 are connected in parallel to corresponding leads of two similar multiples 1011, 1021 emanating from a pair of decoding matrices 1010, 1020 which are energizable, in parallel with two code comparators 810, 820 illustrated in FIG. 5 by way of the output manifolds 120, 220 of memories 100 and 200, respectively. These decoders are also provided with respective inhibiting leads 601 and 602 originating at a logic network 600 (FIG. 5). Also shown in FIG. 6 are a tone generator 1040 with an output lead 1041 extending to network 600 and an input multiple 660 which, like leads 601 and 602, has its origin in network 600. Wires 1002 and 1003 have branches terminating at network 600 while an output lead 605 of that network is connected directly to wire 1004.

The part of the exchange shown in FIG. 5 comprises, in addition to logic network 600, a circulating memory 100 for the address of the caller and a similar memory 200 for the address of the responder, each of these memories being subdivided into three sections (*a*), (*b*), (*c*) each of the type illustrated in FIG. 4. A monitoring memory 300, similar to each one of the sections of address memories 100 and 200, works into the network 600 through a set of leads 320 and receives switching signals from that network by way of a set of leads 610. Two further circulating memories of the same character are a selection memory 400, forming part of an evaluator 430 which also includes a logic circuit 410, and a standby memory 500 adapted to be substituted for any one of the memories or memory sections enumerated above.

A logic matrix 700 is energizable from network 600 via a set of leads 650 and is also controlled by the service pulse $F_2$ (FIG. 1) periodically appearing on an output lead 902 of a timer 910 which generates the various pulse trains described in connection with FIGS. 1—3. Other output leads 901, 903, 904, 905 and 906 of the timer carry the pulses $F_1$, $F_3$, $F_4$, $F_c$ and $Ck_4$ shown in FIG. 1. Pulses $M_T$ (FIG. 3) are delivered to network 600 on a lead 907 whereas line 908 is representative of a pair of leads carrying pulses $M_A$ and $M_B$ of FIG. 2. The latter pulses are received by logic circuit 410 of evaluator 430 which has outputs 411 and 412 leading to network 600 and memory 200, respectively.

Timer lead 903 terminates at the setting input of a flip-flop 830 whose resetting input is energizable by an AND gate 880 having inputs connected to lead 905 and to a lead 603 from network 600. The set and reset outputs of flip-flop 830 are connected through respective AND gates 881 and 882 to the setting and resetting inputs of a flip-flop 840 having a set output 841 extending to network 600; the other inputs of these AND gates are connected in parallel to lead 902. A further AND gate 883, connected to line wire 1003 and timer lead 902, works into the setting input of a fliP-flop 850 having a resetting input connected to lead 901 and a set output 851 terminating at network 600. Lead 902 also energizes an input of an AND gate 884 having another input connected to line wire 902 and working into a setting input of a flip-flop 860 whose resetting input is connected to lead 901 and whose set output 861 works into network 600. A fifth flip-flop 870 has a setting input energizable from network 600 via a lead 604 and a resetting input connected to lead 901, its set output 871 terminating at network 600.

Further output leads 606 and 655 of network 600, also shown in FIG. 5, extend to memory 100 and logic circuit 410, respectively. FIG. 5 also shows a supervisory network 1400, which for simplicity has been depicted as positioned alongside the components heretofore referred to but which actually is traversed by certain of the interconnecting leads thereof as more fully described hereinafter with reference to FIG. 12. The connections controlled by this network include, in FIG. 5, extensions of leads 120, 220, 320, 904 and 908 as well as output leads 420 and 520 of memories 400 and 500.

In addition to the aforedescribed pulses appearing on output leads 901—908 of timer 900, certain other leads shown in FIGS. 5—10 carry various signals identified as follows:

| Lead | Signal |
|---|---|
| 841 | R |
| 851 | D |
| 861 | L |
| 871 | E |
| 651 | $C_1$ |
| 652 | $C_2$ |
| 653 | $C_3$ |
| 655 | $P_0$ |
| 661 | $P_5$ |
| 662 | $P_6$ |
| 663 | $P_7$ |
| 664 | $P_8$ |
| 665 | $P_9$ |
| 666 | $P_{10}$ |
| 811 | $J_1$ |
| 821 | $J_2$ |

| | |
|---|---|
| 711 | Q |
| 411 | $M_F$, $M_L$ |
| 412 | $M_c$ |
| 1003 | $V_c$ |
| 601 | $H_1$ |
| 602 | $H_2$ |
| 603 | $P_1$ |
| 604 | $P_4$ |
| 606 | $P_e$ |
| 654 | $P_N$ |

Figure 8:
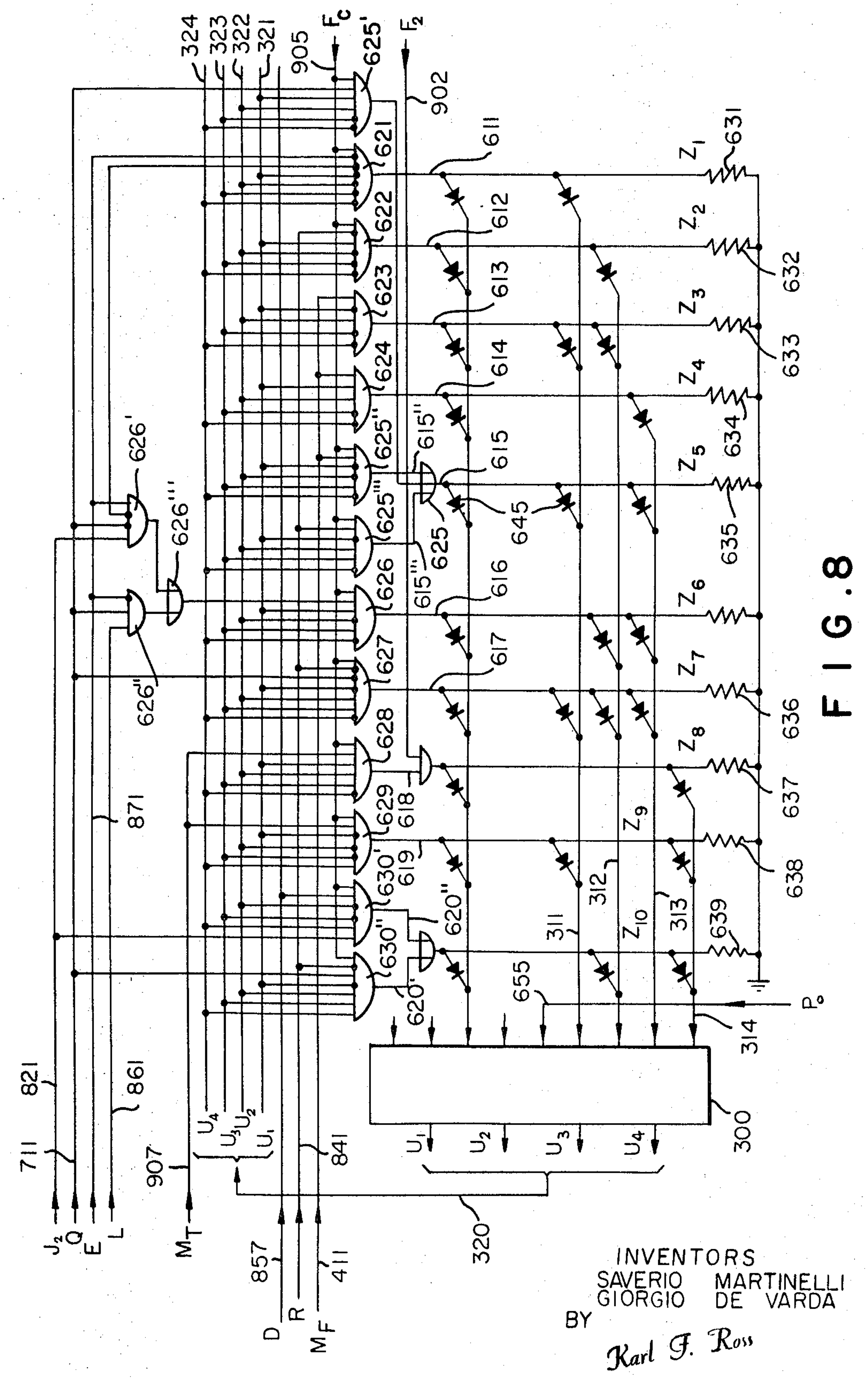

Furthermore, there are shown in FIG. 8 a set of lead 611—620 on which pulses designated $Z_1$—$Z_{10}$ are developed across respective resistors 631—640 to enter respective code words, representative of the progress of a call between addresses inscribed in a time slot of memories 100 and 200, in a corresponding phase of memory 300. These code words therefore indicate various states, numbered from 1 through 10, of a call tagged thereby.

Moreover, signals applied to certain inputs of the three sections of memory 200 have been designated, in conformity with the designations of FIG. 4, $C_a$, $T_e$, $T_1$, $T_o$ followed by the identifying postscripts (*a*), (*b*), (*c*); analogously, the corresponding output signals will be referred as $U_1$—$U_4$, again followed by the same distinguishing postscripts.

The binary gates of the several logic circuits shown in subsequent FIGS. are conventionally illustrated as follows:

AND gate:Semicircle with input leads terminating at diameter:

OR gate:Semicircle with input leads traversing diameter; and

Inverting Input:Dot at junction of lead with diameter.

Briefly, the operation of the system so far described is as follows: At the beginning of each memory cycle, more specifically during phase $\Phi_2$ thereof, a pulse $F_2$ on lead 902 reaches the memory 200 through matrix 700 to increase (or decrease), by a unit step, the numerical value of an address which had been stored during the preceding cycle in that time slot. Thus, the 1000 addresses assigned to the subscriber and trunk lines served by the exchange are sequentially entered in this particular time slot during an interval of 0.1 sec. and are cyclically repeated during successive intervals of like duration. Since this operation serves only for the repetitive testing of the corresponding line voltages, the recurrence of the same address exactly every 1000 cycles is not critical.

Figure 7:
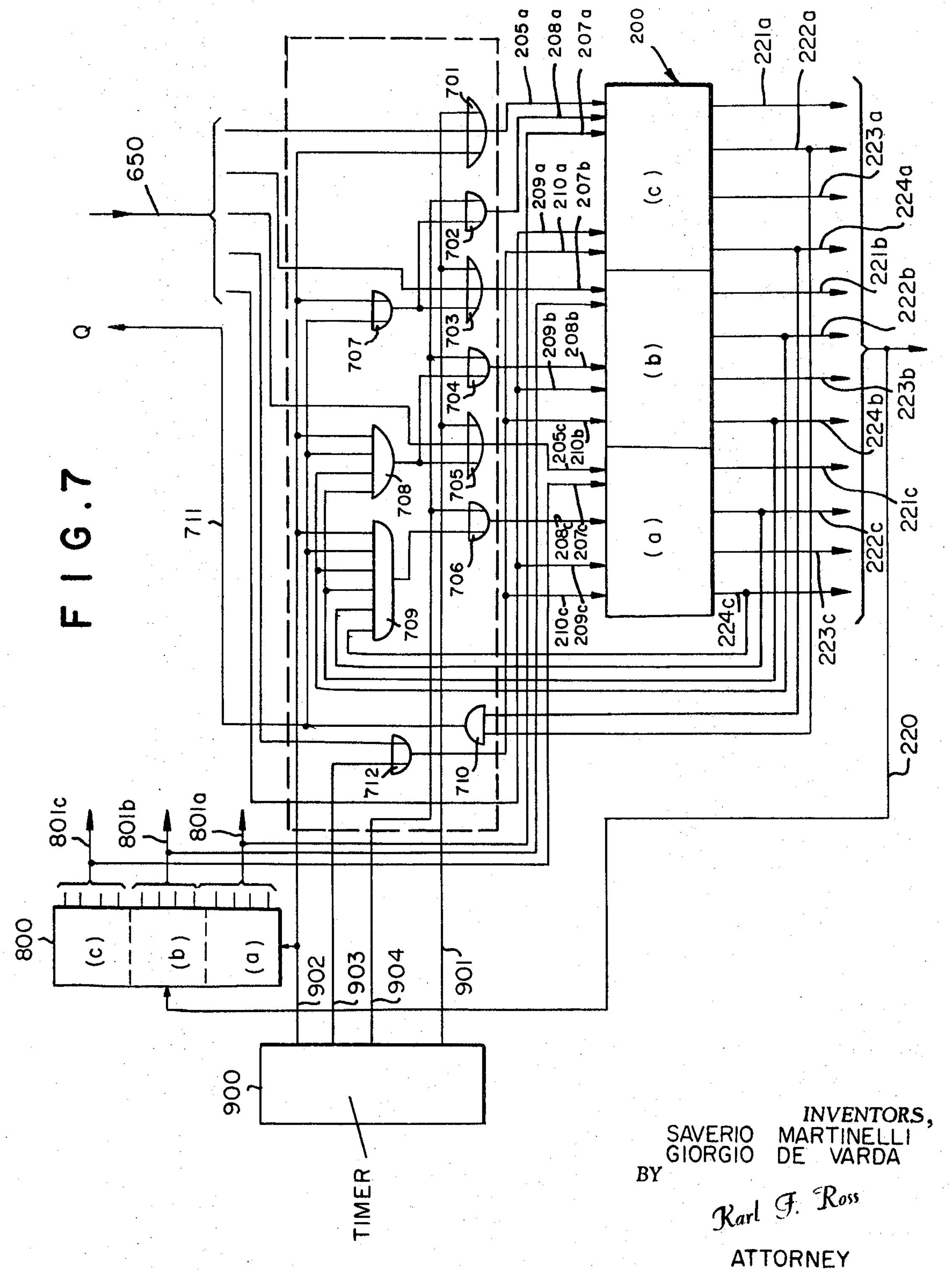
FIGS. 7, 8, 9 and 10 are more detailed circuit diagrams of different portions of the exchange shown in FIGS. 5 and 6.

Pulse $F_2$ also conditions the buffer register 800 for inscription therein of the contents of the same time slot stored in memory 200 during the preceding 100-$\mu$sec. cycle, the output multiple 220 of memory 200 being connected for this purpose to the inputs of register 800 which is also subdivided into three sections (*a*), (*b*), (*c*), as illustrated in FIG. 7. Register 800 thus successively stores the addresses of all 1000 lines during substantially the same interval of 0.1 sec. as does the memory 200.

The address appearing in the output 220 of memory 200 at instant $\Phi 2$ is also fed to the decoder 1020 which at the same instant closes the line switches of the station thus identified, e.g. switches 1101 and 1103 of the subscriber station 1110. If the line loop is open, no further notice is taken during the following cycle of this particular line; if, however, the wire 1003 carries voltage at that moment, AND gate 883 conducts to set the flip-flop 850 whose output thereupon applies a signal to network 600 on conductor 851. Signal D persists for the remainder of the cycle, i.e. throughout the 96 communication phases thereof, flip-flop 850 being reset by pulse $F_1$ on lead 901 at the beginning of the following cycle.

The presence of signal D triggers the network 600 into causing the transfer of the contents of buffer register 800 to memory 100 in the first available communication time slot of that memory. Simultaneously, memory 300 is actuated by network 600 to enter a code word $Z_1$ in the corresponding time slot thereof as a tag to indicate a tentative start of a communication. Lest the same address be entered in more than one time slot of memory 100, output lead 604 trips the flip-flop 870 to indicate the seizure of a channel by the calling subscriber throughout the remainder of the cycle, the flip-flop being reset by the pulse $F_1$ at the beginning of the next cycle.

If the calling subscriber line is already engaged in an incipient or continuing conversation, its address emerges from the output 120 of memory 100 in one of the communication phases of the same cycle. In such a case (with certain exceptions described hereinafter) the comparator 810, noting the identities between the memory output and the contents of register 800, responds by transmitting a signal $J_1$ on its outgoing lead 811 to the network 600 which thereupon energizes its lead 603 to set the flip-flop 830, the AND gate 880 having been made conductive by the existence of a pulse $F_c$ on conductor 905. This precaution is necessary to prevent the setting of flip-flop 830 during the service phase $\Phi_2$ in which the output of memory 100 is transmitted to buffer register 800. During the next phase $\Phi_2$, AND gate 881 passes a setting signal from flip-flop 830 to flip-flop 840 just before flip-flop 830 is reset by a pulse $F_3$ on lead 903. Flip-flop 840 remains set until a pulse $F_2$ coincides with a reset condition of flip-flop 830.

Under the circumstances just described, flip-flop 841 generates a signal R on lead 841 to inform the logic network 600 that a call involving the address recently entered into the memory 100 is already in progress, whereupon memory 300 is actuated to cancel the code $Z_1$ previously inscribed in the corresponding time slot.

If, however, comparator 810 does not respond, the presumption of a new call arises whereupon memory 300 is stepped to enter a code $Z_2$ in the time slot concerned. This condition results in an actuation of tone generator 900 which now sends a dial tone to the calling subscriber. The dialing pulses then transmitted by the subscriber to wire 1003 are picked up by logic circuit 410 of evaluator 430 which translates them into binary signals representing the 3-digit address of the station called. The generation of an end-of-digit signal $M_F$ on the output lead 411 of unit 430 successively directs the three binary words of the address to the respective sections (*a*), (*b*), (*c*) of memory 200, this transfer being accompanied by the successive entry of tagging codes $Z_3$, $Z_4$, $Z_5$ in the assigned time slot of memory 300.

The occurrence of code $Z_5$ signals the beginning of a waiting period for a testing of the selected subscriber line. (If the first digit dialed by the calling subscriber had been a "0," indicating that the wanted line was a trunk, the operation would have been modified by the skipping of states Nos. 3 and 4 to establish the same waiting condition marked by the tag $Z_5$.)

The address of the called party now recurs once per cycle in the output of memory 200 at an instant corresponding to the time slot allotted to the calling subscriber. The waiting period continues until the periodic testing of the lines at phase 2 results in the entry of the same responder's address in buffer register 800 whereupon, on detecting the identity of the output of memory 200 during a communication time slot with the contents of that register, comparator 820 delivers to network 600 a signal $J_2$ (FIGS. 8—10) on lead 821 whereby the memory 300 is energized to advance the corresponding time slot from state No. 5 to state No. 6 indicating a tentative seizure of the called line.

If the address of the party selected by the calling subscriber is already entered in memory 100 or is inscribed in memory 200, with the corresponding monitoring phase in one of its states Nos. 7—10 to indicate that the line is already engaged in a more advanced stage of another connection initiated by that line or by a third station, comparator 810 or 820 emits a signal $J_1$ or $J_2$ with resultant energization of lead 603 and the constant setting of flip-flops 830 and 840 as described above. The signal R on lead 841 then causes the return of the monitoring phase to its waiting state No. 5; at the same time a busy signal is sent by the tone generator 1040 to the calling subscriber via wire 1001.

If, however, the called line is free, the monitoring phase advances to the state No. 7 which triggers the tone generator 1040 to emit a first ringing signal lasting for not more than half a second. Upon the occurrence of the next shifting pulse $M_T$ on lead 907, the state No. 9 is reached with periodic generation of the ringing signal RP and the calling signal *rp*, as illustrated in FIG. 3, in the rhythm of blocking-pulse train $G_s$. When the called subscriber answers, the setting of flip-flop 850 to generate the signal D on lead 851, as previously described, indicates that the station identified by the address in register 800 has answered the call if such closure coincides with the emergence of the address of that station from the output of memory 200 as determined by comparator 820. The state of the phase then changes from No. 9 to No. 10, thus labeling the communication channel as established. Such changeover may also occur directly from state No. 8 if the responder answers the call upon the first ring.

If the line selected by the calling station had been the trunk 1300, the caller would have dialed the remainder of the address (after the initial digit "0") upon final seizure of that trunk, as indicated by the state No. 7, through energization of lead 605 transmitted directly to line wire 1004 with resultant stepping of repeater relay 1316 to short circuit the trunk line in the rhythm of the dial pulses.

If the calling station had been a trunk rather than a local subscriber, the presence of line current on a wire of signal path 1000 common to all the trunks (similar to wires 1002, 1004) would have tripped a bistable circuit similar to elements 883, 850 to generate a signal analogous to signal D on lead 851 for starting the establishment of a connection.

We shall now describe, with reference to FIGS. 7—10, the details of the several operating steps outlined above.

FIG. 7 illustrates the logic of matrix 700 which controls the inscription of addresses in the responder memory 200 whose three sections (*a*), (*b*), (*c*) have been shown provided with inputs 205*a*, 205*b*, 205*c* and 207*a*—210*a*, 207*b*—210*b* and 207*c*—210*c* designated analogously to those described in connection with FIG. 4. The corresponding outputs are also analogous designated 221*a*—224*a*, 221*b*—224*b* and 221*c*—224*c*. Register 800, connected via multiple 220 with these outputs, has its own output multiples 801*a*, 801*b*, 801*c* connected to input multiples 210*a*, 210*b*, 210*c* for inscribing the address of a trunk terminal, such as station 1310, in the time slot of memory 200 coinciding with the one seized by the calling station in memory 100. This operation takes place after the monitoring phase has been advanced directly from state No. 3 to state No. 5, skipping state periods reserved for the dial pulse trains of the second and third address digits upon the detection of a trunk request by a signal Q on conductor 711.

More particularly, a pulse $F_2$ on lead 902 periodically passes an OR gate 701 to reach the counting input 205*a* of section 200 (*a*), this signal recurring whenever a dial pulse is detected by unit 430 and reconstituted as a pulse $M_c$ reaching the memory 200 by way of logic network 600 and line 412 (schematically illustrated in FIG. 5 as going directly to the memory). Every time a dial pulse is thus retransmitted, which occurs during successive but widely spaced-apart operating cycles of the memory, section 200(*a*) is stepped until it reaches the binary output 1010 (numerical value 10) represented by the concurrent energization of leads 222*a* and 224*a*. An AND gate 710 connected across these leads now opens another AND gate 707 which, via an OR gate 702, energizes the input 208*a*, to set that memory section to its starting count "1" as soon as gate 707 receives the timing pulse $F_2$ from lead 902. At the same time, a carry is registered in section 200(*b*) by way of an OR gate 703. When the latter section reaches its maximum count with concurrent energization of leads 220, 222*b* and 224*b*, an AND gate 708 responds to the concurrent presence of a pulse $F_2$ on lead 902 and a pulse Q on the output lead 711 of AND gate 710 to set section 200(*b*) to "1" via an OR gate 704 and input 209*b* while transmitting a carry to a section 200(*c*) via an OR gate 705 and input 205*c*. Upon the stepping of this last section to "10," an AND gate 709 is analogously energized by the simultaneous pulses on output leads 222*a*, 224*a*, 222*b*, 224*b*, 222*c*, 224*c* to energize lead 208*c* for setting section 200(*c*) to "1" by way of an OR gate 706. This periodic forward counting constitutes the entry of consecutive addresses in the memory during the service phase $100_2$.

Essentially the same type of counting takes place when selection impulses $C_1$, $C_2$, $C_3$ arrive at the same counting inputs 205*a*, 205*b*, 205*c*, respectively, in states Nos. 2, 3 and 4 of the monitoring phase; an exception here is the stepping of the first section 200(*a*) to its maximum count of 10 which, by generating the signal Q on lead 711, halts the transmission of further selection impulses to the memory via leads 652 and 653.

A pulse $P_N$ on lead 654 passes through an OR gate 712 to inputs 207*a*, 207*b*, 207*c* to inscribe the contents of register 800, simultaneously present on inputs 207*a*, 207*b* and 207*c*, in the sections of memory 200.

A zero-setting pulse $P_o$ on lead 655, passing through an OR gate 712, reaches the inputs 209*a*, 209*b*, 209*c* to clear the memory 200.

The several OR gates 701—706 and 712 also permit the sections of memory 200 to be energized by service pulses $F_1$, $F_3$ and $F_4$ on leads 901, 903, 904 for checking purposes as will be more fully described hereinafter.

FIG. 8 shows that part of network 600 which controls the inscription of the state-of-phase codes represented by pulses $Z_1$—$Z_{10}$ in selected time slots of memory 300. For convenience, and by analogy with FIG. 4, the output pulses of this memory are again designated $U_1$—$U_4$, these pulses being fed back via multiple 320 to conductors 321—324. Other conductors 655, 821, 711, 871, 861, 907, 851, 841 and 411 carry the signals $P_o$, $J_2$, Q, E, L, $M_T$, D, R and $M_F$ previously referred to. These leads are selectively combined in a logic matrix which comprises a multiplicity of AND gates with partly inverting inputs, OR gates and diodes. The AND gates include main gates 621—629 and ancillary gates 625′, 625″, 625‴, 626′, 626″, 628′, 630′ and 630″; the diodes, collectively designated 645′, are connected in a conventional pattern between the output conductors 611—620 of the gates and the input leads 307 and 311—314 of memory 300. Conductors 611—614 and 616—619 are connected in the outputs of respective AND gates 621—624 and 626—629, with interposition of an OR gate 628′in the case of lead 618. OR gate 628′ also receives the timing pulse$F_2$ on lead 902. Lead 615 is energized by way of an OR gate 25 receiving the output leads 615′, 615″ and 615‴ of three further AND gates 625′, 615″ and 625‴. The input circuit of AND gate 626 includes two other AND gates 626′, 626″ and an OR gate 626‴. Lead 620, finally, is energized by the output leads 620′, 620″ of two AND gates 630′, 630″ merging at an OR gate 630. Phasing pulse $F_c$ on lead 905 reaches all the AND gates 621, 622, 625′, 625″, 625‴, 625—629, 630′ and 630″.

The generation of the various monitoring signals $Z_1$—$Z_{10}$ proceeds as follows, it being assumed that lead 905 carries voltage which is true in all phases except service phases $\Phi_1$—$\Phi_4$.

Beginning with a cleared state of a time slot or phase of memory 300, i.e. with no potential on leads $U_1$—$U_4$, AND gate responds to a signal D on line 851 indicating seizure of the line, thereby energizing lead 611 to create the signal $Z_1$ in the event that lead 871 is deenergized. This condition is necessary to prevent the seizure of more than one time slot of memories 100 and 300 by a line found to be active. Signal $S_1$, represented by a pulse $U_1$ on lead 320, conditions the AND gate 622 for conducting in the absence of a pulse R on lead 841 whose presence would indicate a preexisting busy condition of the tested line; if such condition exists, the time slot is cleared by zero-setting pulse $P_o$ on lead 655 generated by the logic matrix shown in FIG. 9. If, however, the line was previously idle, pulse $Z_2$ energizes conductor 322 to condition the AND gate 623 for establishment of the next-higher state No. 3 in response to the first end-of-digit pulse $M_F$ on lead 411; in like manner, the recurrence of pulse $M_F$ establishes states Nos. 4 and 5 by way of AND gates 624 and 625″, respectively.

It will be noted that the transition to states Nos. 3 and 4 is not limited to the communication phases $\Phi_5$—$\Phi_{100}$ but that the establishment of state No. 5 again requires the presence of pulse $F_c$.

The system now waits for the seizure of the called line which occurs upon the entry of its address in register 800 at the beginning of an operating cycle. This entry manifests itself in the occurrence of a signal $J_2$ on lead 821 to open the AND gate 626 by way of gates 626' and 626'', provided that the pulses $D$, $E$ and Q on leads 851, 871 and 711 are absent. The condition $D=O$ verifies that the called subscriber has not lifted the receiver off the hook at that instant. Condition $E=O$ guards against the possibility that the absence of line current, and therefore of a pulse $D$, is due to a momentary interruption of the line loop by a dialing pulse from the called subscriber. The condition $Q=O$ establishes that the called station is not a trunk line.

Figure 9:
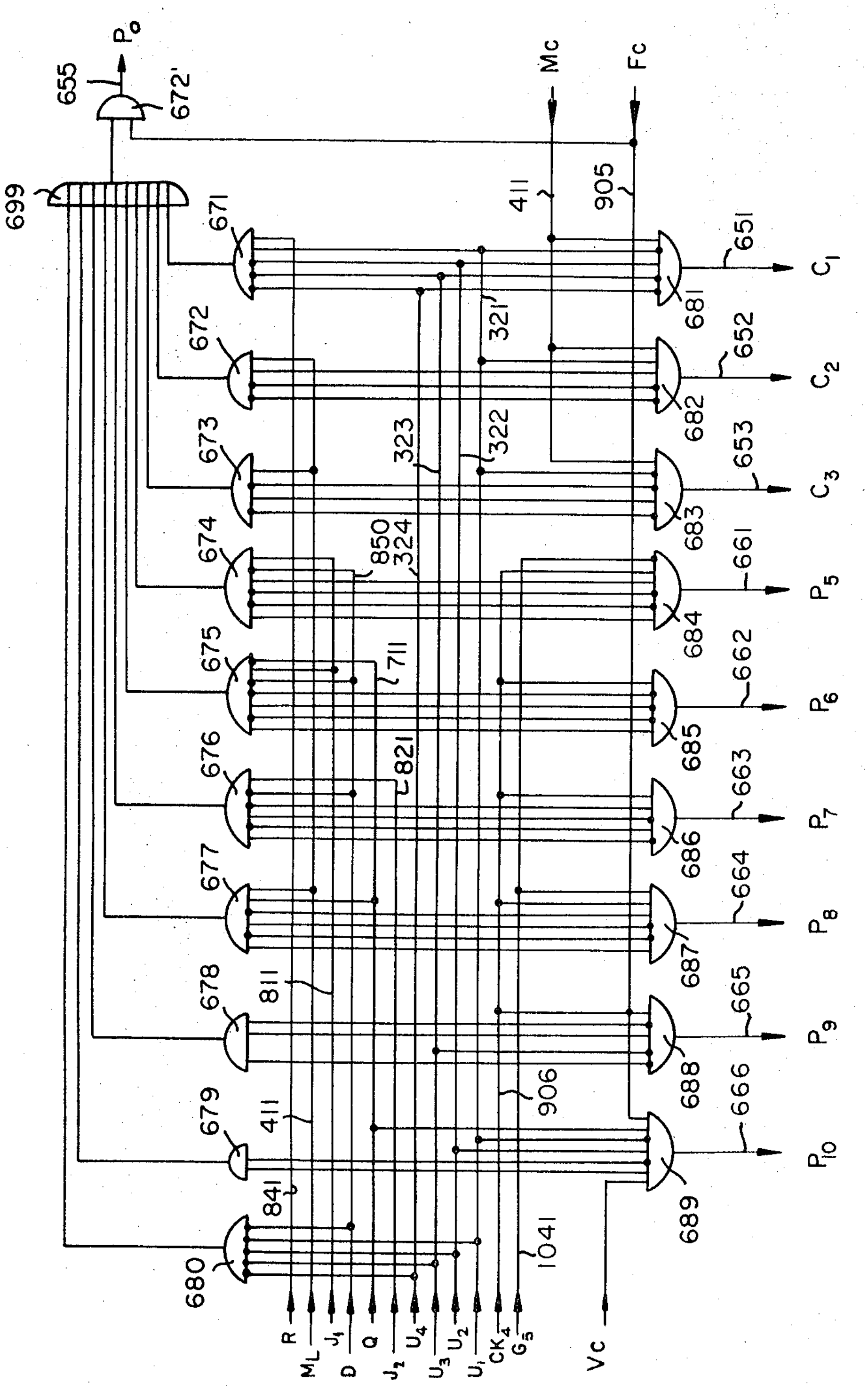

If a signal $D$ and/or $E$ is present, the corresponding phase of memory 300 remains in its state No. 5 and a busy signal is transmitted to the calling subscriber by the tone generator 1040 which is actuated by a pulse $P_7$ on lead 663 (FIG. 9).

If the called line is free or has terminated its previous engagement, it is conditionally seized by the transition to state No. 6 which serves for the exploration of the possibility that a third party has seized the same line and is already engaged in a more advanced calling state, i.e. in one of the states Nos. 7—10. In such an event the presence of a pulse R on lead 841 blocks the gate 627 and opens the gate 625''' to restore the state No. 5.

If, however, no other call takes precedence, signal $Z_7$ is generated and leads to the automatic transition to states Nos. 8 and 9 by the recurrent timing signal $M_T$ on lead 907. In state No. 8 a single ringing pulse is transmitted by the tone generator 1040 in response to a pulse $P_6$ on lead 662 (FIG. 9); in state No. 9 a periodic ringing pulse RP (FIG. 3) is generated by unit 1040 under the control of a pulse $P_8$ on lead 665.

The transmission of the ringing pulse is accompanied by a retransmission of a call signal $rp$ to the originating subscriber, as described in connection with FIG. 3, under the control of a pulse $P_5$ on lead 661 (FIG. 9).

When the called subscriber responds, the monitoring phase advances to its final state No. 10 by virtue of the flow of loop current in the called line as established by a pulse $D$ on lead 851 opening the gate 630'.

If a trunk is requested by the calling subscriber, as indicated by the occurrence of a pulse Q on lead 711, AND gate 625' opens before the occurrence of an end-of-digit pulse $M_F$ so as to generate the pulse $Z_5$ in lieu of pulse $Z_4$ upon the concurrent energization of conductors 321 and 322. When the address of a trunk appears in register 800, a pulse L develops on lead 861 and, if lead 871 is deenergized to indicate that this trunk has not been preempted by another call, AND gate 626'' opens in the continuing presence of a pulse Q to unblock the AND gate 626, thereby establishing the state No. 6. With the address of the trunk inscribed in the corresponding time slot of memory 200, the presence or absence of a signal R on lead 841 indicates the busy or free state of the trunk; the system then either reverts to state No. 5 or advances directly to state No. 10 by the opening of gate 630'', gate 627 being blocked by the pulse Q on lead 711.

Thus, the available trunks up to 100 (with addresses ranging from 000 to 099) can be indiscriminately assigned to any calling party requesting a trunk by the dialing of a first digit "0."

Figure 10:
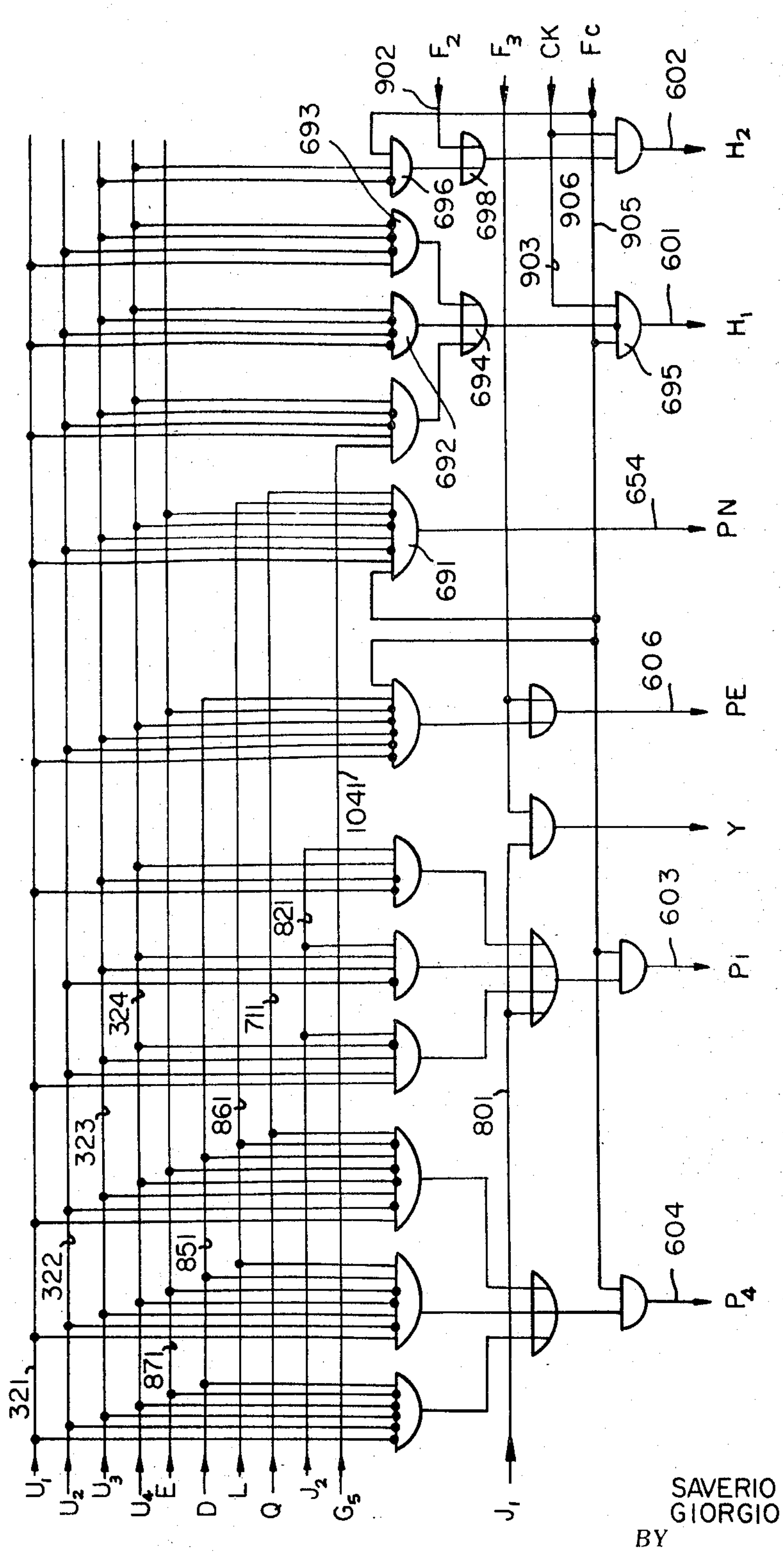

The generation of the various signals previously referred to is illustrated in FIGS. 9 and 10. Zero-setting signal $P_o$ is generated, in the presence of a pulse $F_c$, by the output of an OR gate 699 working into an AND gate 672 whose inputs receive the outputs of other AND gates 671—680.

AND gate 671 is opened in state No. 1 by the signal R indicating the busy condition of the tested line. AND gates 672 and 673 respond to the "line released" signal $M_L$ in states Nos. 2—5. In state No. 9, when the called party fails to respond to the ringing signal, AND gate 674 operates upon the cessation of line current from the calling subscriber as determined by the absence of signal D. Gate 675 is unblocked by the presence of signal $J_1$ and absence of signal D in state No. 10, indicating that the caller has hung up. Gate 676 serves the same function with regard to the called party under the control of a signal $J_2$. Signal $M_L$ also opens the gate 677 in the presence of signal Q indicating a trunk call.

Gates 678 and 679 serve to rectify malfunctions of the logic network leading to the incorrect establishment of an output greater than count 10, i.e. binary word 1011, 1110 or 1111. Gate 680, finally, maintains the zero state of the time slot in the absence of overriding input signals.

Other AND gates 681—689 deliver the pulses previously referred to on leads 651—653 and 661—665.

FIG. 10 shows a series of AND and OR gates for the generation of pulses $P_1$, $P_4$, $P_E$ and $P_N$ on leads 603, 604, 606 and 654, respectively. Also illustrated is the generation of enabling pulses $H_1$ and $H_2$ on leads 601 and 602, respectively. Pulse $H_1$, designed to protect the calling subscriber from switching and ringing noises, is suppressed in states Nos. 1, 8 and 9, the latter in response to the blocking signal $G_s$; this is accomplished by a set of AND gates 691, 692, 693 working through an OR gate 694 into an AND gate 695. Signal $H_2$ is always generated in states Nos. 8, 9 and 10 and also arises from the pulses $F_2$, this being accomplished by two AND gates 696, 697 and an OR gate 698. The clock pulses $Ck_4$ are applied to gates 695 and 697 to determine the precise width of these enabling pulses.

The logical equations for the generation of all the pulses arising from the circuitry of FIGS. 7—10 are as follows:

$$C_a(a)=C_1+F_2+F_1$$
$$C_a(b)=C_2+F_2\cdot Q+F_4$$
$$C_a(c)=C_3+F_2\cdot Q\cdot U_4(b)\cdot U_2(b)+F_1$$
$$T_1(a)=F_2\cdot Q+F_4$$
$$T_1(b)=F_2\cdot \bar{Q}\cdot U_4(b)\cdot U_2(b)+F_4$$
$$T_1(c)=F_2\cdot Q\cdot U_4(b)\cdot U_2(b)\cdot U_4(c)\cdot U_2(c)+F_4$$
$$T_e(a)=T_e(b)=T_e(c)=P_N+F_3$$
$$Q=U_2(a)+U_4(a)$$
$$Z_1=\bar{U}_4\cdot\bar{U}_3\cdot\bar{U}_2\cdot\bar{U}_1\cdot\bar{E}\cdot D\cdot F_c$$
$$Z_2=\bar{U}_4\cdot\bar{U}_3\cdot\bar{U}_2\cdot\bar{U}_1\cdot\bar{R}\cdot F_c$$
$$Z_3=\bar{U}_4\cdot\bar{U}_3\cdot U_2\cdot\bar{U}_1\cdot MF$$
$$Z_4=\bar{U}_4\cdot\bar{U}_3\cdot U_2\cdot U_1\cdot M_F$$
$$Z_5=\bar{U}_4\cdot\bar{U}_3\cdot U_2\cdot U_1\cdot Q\cdot F_c+\bar{U}_4\cdot U_3\cdot\bar{U}_2\cdot\bar{U}_1\cdot M_F\cdot F_c+\bar{U}_4\cdot U_3\cdot U_2\cdot\bar{U}_1\cdot R\cdot F_c$$
$$Z_6=(Q\cdot\bar{E}\cdot L+\bar{Q}\cdot\bar{E}\cdot J_2\cdot\bar{D})\cdot\bar{U}_4\cdot U_3\cdot\bar{U}_2\cdot U_1\cdot F_c$$
$$Z_7=\bar{U}_4\cdot U_3\cdot U_2\cdot\bar{U}_1\cdot\bar{R}\cdot\bar{Q}\cdot F_c$$
$$Z_8=\bar{U}_4\cdot U_3\cdot U_2\cdot U_1\cdot M_T\cdot F_c+F_2$$
$$Z_9=U_4\cdot\bar{U}_3\cdot\bar{U}_2\cdot\bar{U}_1\cdot M_T\cdot F_c$$
$$Z_{10}=U_4\cdot U_3\cdot U_2\cdot J_2\cdot D\cdot F_c+U_4\cdot U_3\cdot U_2\cdot\bar{U}_1\cdot Q\cdot\bar{R}\cdot F_c$$
$$P_o=[\bar{U}_4\bar{U}_3\bar{U}_2U_1R+\bar{U}_4\bar{U}_3U_2M_L+\bar{U}_4U_3\bar{U}_2M_LU_4\bar{U}_3\bar{U}_2U_1\bar{D}J_1+U_4\bar{U}_3U_2\bar{U}_1\bar{D}\bar{Q}J_I+U_4\bar{U}_3U_2\bar{U}_1\bar{D}J_N+U_4\bar{U}_3U_2\bar{U}_1QM_L+U_4U_3+U_4U_2U_1+\bar{U}_4\bar{U}_3\bar{U}_2\bar{U}_1\bar{D}]F_c$$
$$P_1=[J_1+J_2\bar{U}_4U_3U_2U_1+J_2U_4\bar{U}_3\bar{U}_2+J_2U_4\bar{U}_3\bar{U}_1]F_c$$
$$P_4=[\bar{U}_4\bar{U}_3\bar{U}_2\bar{U}_1\bar{E}D+\bar{U}_4U_3\bar{U}_2U_1Q\bar{E}L+\bar{U}_4U_3\bar{U}_2U_1\bar{Q}\bar{E}J_2\bar{D}]F_c$$
$$P_5=U_4\bar{U}_3\bar{U}_2U_1\bar{G}_SCK_4F_c$$
$$P_6=U_4\bar{U}_3\bar{U}_2\bar{U}_1CK_4F_c$$
$$P_7=\bar{U}_4U_3\bar{U}_2U_1CK_4F_c$$
$$P_8=U_4\bar{U}_3\bar{U}_2U_1G_SCK_4F_c$$
$$P_9=\bar{U}_4\bar{U}_3U_2\bar{U}_1CK_4F_c$$
$$P_{10}=U_4\bar{U}_3U_2\bar{U}_1QV_cF_c$$
$$C_1=\bar{U}_4\bar{U}_3U_2\bar{U}_1M_c$$
$$C_2=\bar{U}_4\bar{U}_3U_2U_1M_c$$
$$C_3=\bar{U}_4U_3\bar{U}_2\bar{U}_1M_c$$
$$P_E=\bar{U}_4\bar{U}_3\bar{U}_2\bar{U}_1\bar{E}DF_c+F_3$$
$$P_N=\bar{U}_4U_3\bar{U}_2U_1Q\bar{E}LF_c$$
$$H_1=[U_4\bar{U}_3\bar{U}_2U_1G_S+\bar{U}_4\bar{U}_3\bar{U}_2U_1+U_4\bar{U}_3\bar{U}_2\bar{U}_1]F_cCK_4$$
$$H_2=[U_4\bar{U}_3F_c+F_2]CK_4$$

Figure 11:
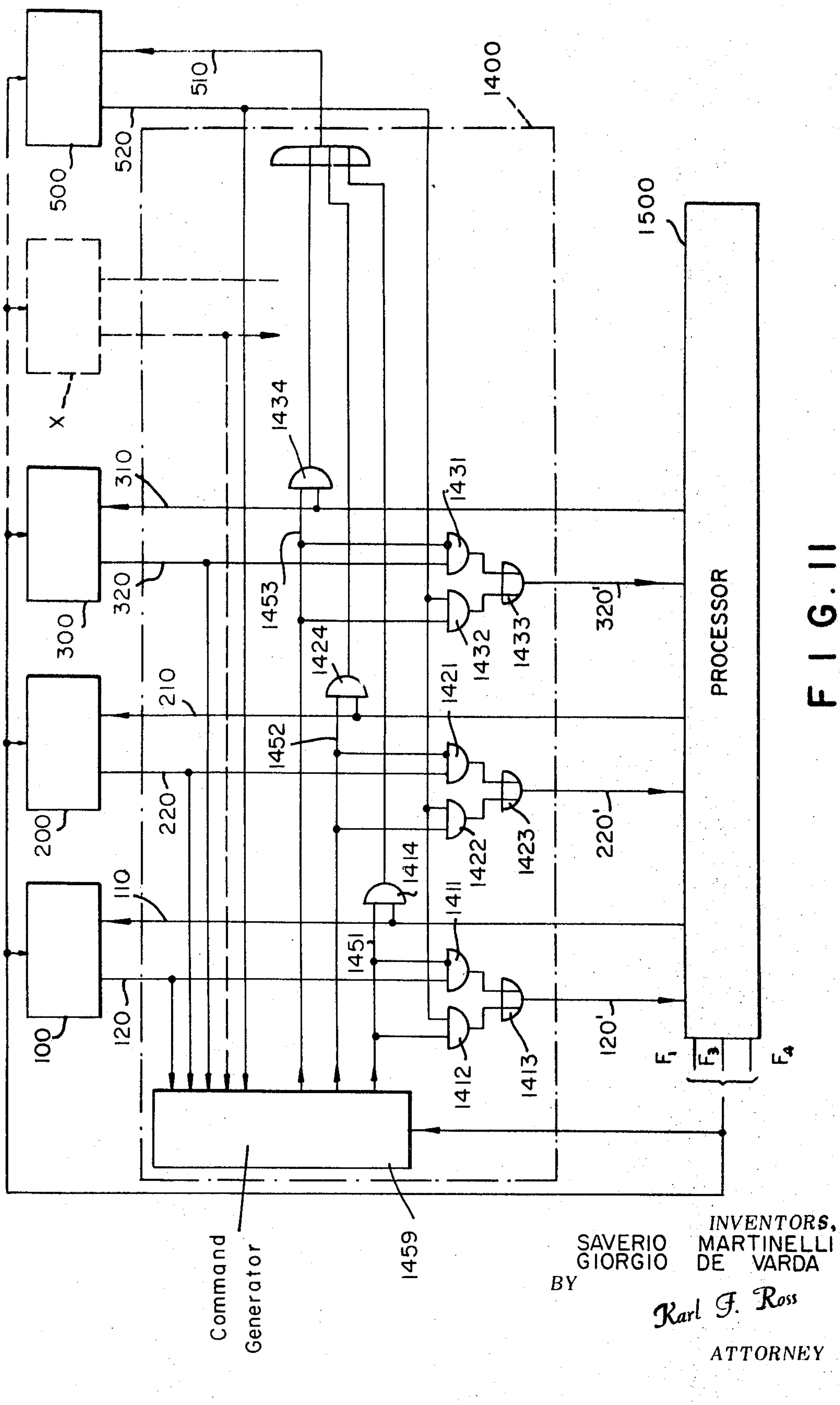
FIG. 11 is a circuit diagram of a supervisory network included in the exchange of FIGS. 5—10.

In FIG. 11 we have diagrammatically illustrated the supervisory network 400 together with an associated processor 1500, the network 1400 including a command generator 1450. Memories 100, 200, 300 and 500 are shown together with their respective input multiples 110, 210, 310, 510 (representing all the input leads illustrated in FIG. 4) and output multiples 120, 220, 320, 520, together with a further memory X (dotted lines) standing for any similarly constituted modules included in the system, such as the unit 400 of FIG. 5. Processor 1500 is representative of the networks 600 and 700 of FIG. 5, the figure showing that the input and output connections previously described traverse the network 400 as noted above.

Processor 1500 is representative of the networks 600 and 700 of FIG. 5, the figure showing that the input and output connections previously described traverse the network 400 as noted above.

Network 1400 is designed to substitute the standby module 500 for any of the memories 100, 200, 300, or an individual section thereof, it being assumed for the sake of simplicity that any of these memories consists of only one section.

The checking of the proper performances of the active modules 100, 200, 300 occurs under the control of pulses $F_1$, $F_3$, $F_4$ emitted by the timer 900 (FIG. 5) include the equipment 1500. These pulses are fed to corresponding inputs of all the active memories, over circuitry illustrated in FIGS. 7 and 10, to energize their forward-counting inputs $C_a$ (pulse $F_1$), their zero-setting inputs $T_o$ (pulse $F_3$) and their "INSCRIBE 1" inputs $T_1$ (pulse $F_4$). For reasons that will become apparent hereinafter, the active memories to be checked are divided into groups of three, here units 100, 200 and 300, whose outputs 120, 220, 320 are delivered to respective AND gates 1411, 1421, 1431 also receiving switching signals $SW_1$, $SW_2$, $SW_3$ on leads 1451, 1452, 1453 emanating from command generator 1450. Other AND gates 1412, 1422, 1432 receive the output 520 of standby module 500 along with the same switching signals, the two AND gates of each checking circuit working through a respective OR gate 1413, 1423, 1433 into extensions 120', 220', 320' of the multiples 120, 220 and 320. Further AND gates 1414, 1424, 1434, receiving the switching signals $SW_1$, $SW_2$, $SW_3$ from generator 1450 together with the input signals for the associated memories from multiples 110, 210 and 310, work through an OR gate 1440 into the input multiple 510 of standby unit 500.

Figure 12:
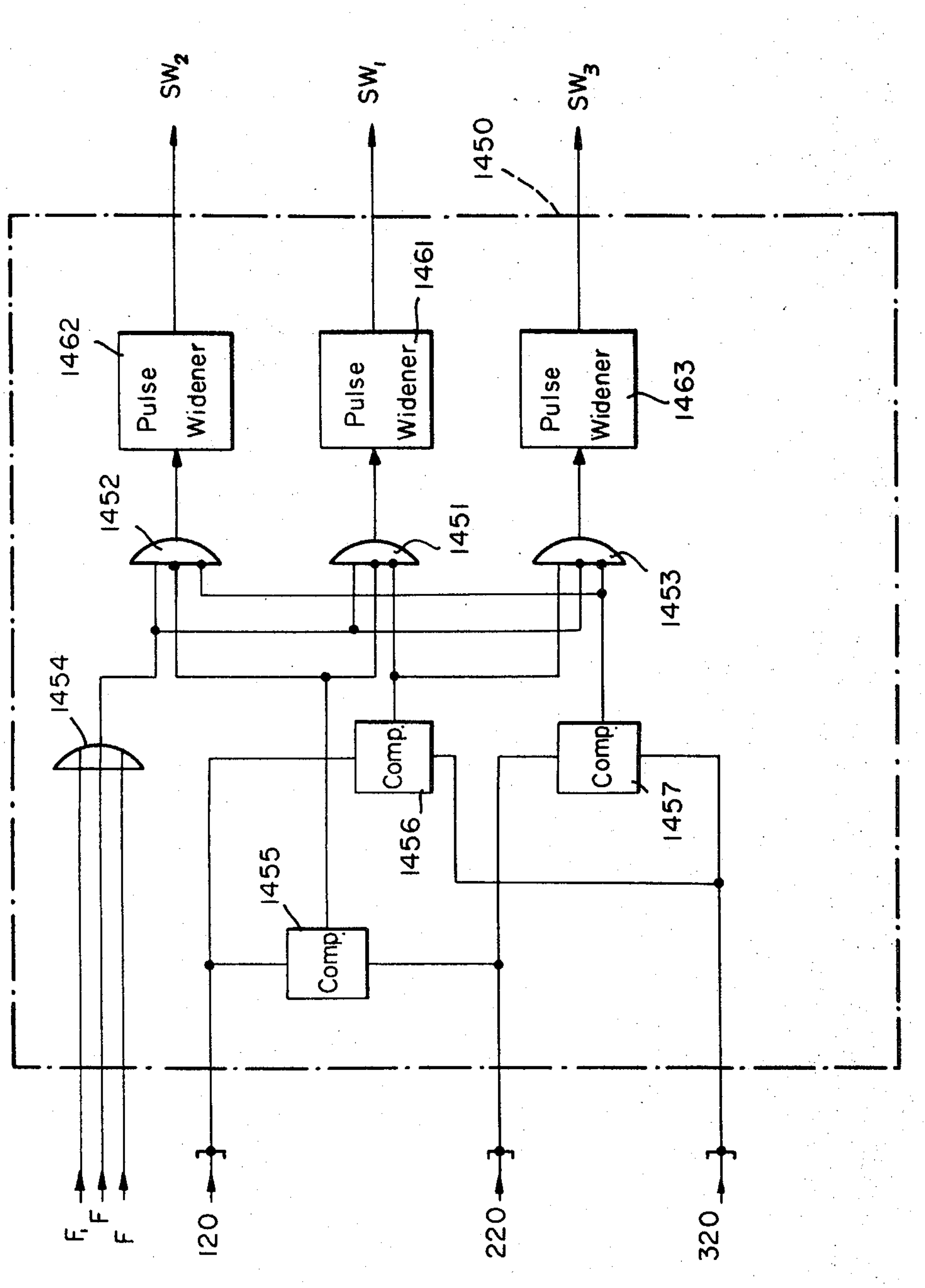
FIG. 12 shows details of a unit of the network illustrated in FIG. 11.

In FIG. 12 we have shown details of command generator 1450, including three AND gates 1451, 1452, 1453 energized in parallel by an OR gate 1454 and by the outputs of respective comparators 1455, 1456, 1457 across which the multiples 120, 220, 320 are connected in three different combinations, and AND gates 1451, 1452, 1453 generating the signals $SW_1$, $SW_2$, $SW_3$ through respective pulse shapers 1461, 1462, 1463 serving to extend the width of the input signals to a full operating cycle of 100 $\mu$sec.

The comparators 1455—1457 deliver a true output only in the presence of matching input signals. Thus, a defect of, say, memory 100 will manifest itself in the absence of a pulse in the two inverting inputs of a single AND gate, specifically the gate 1461, common to units 1455 and 1456, so that the switching pulse $SW_1$ emerges to block the AND gates 1411, 1412 (FIG. 11) and to unblock the AND gate 1414 whereby the unit 500 is effectively substituted for unit 100.

If any one of the comparators 1455—1457 should fail, the system would not malfunction because none of the associated AND gates would have an output due only to such failure.

Figure 13:
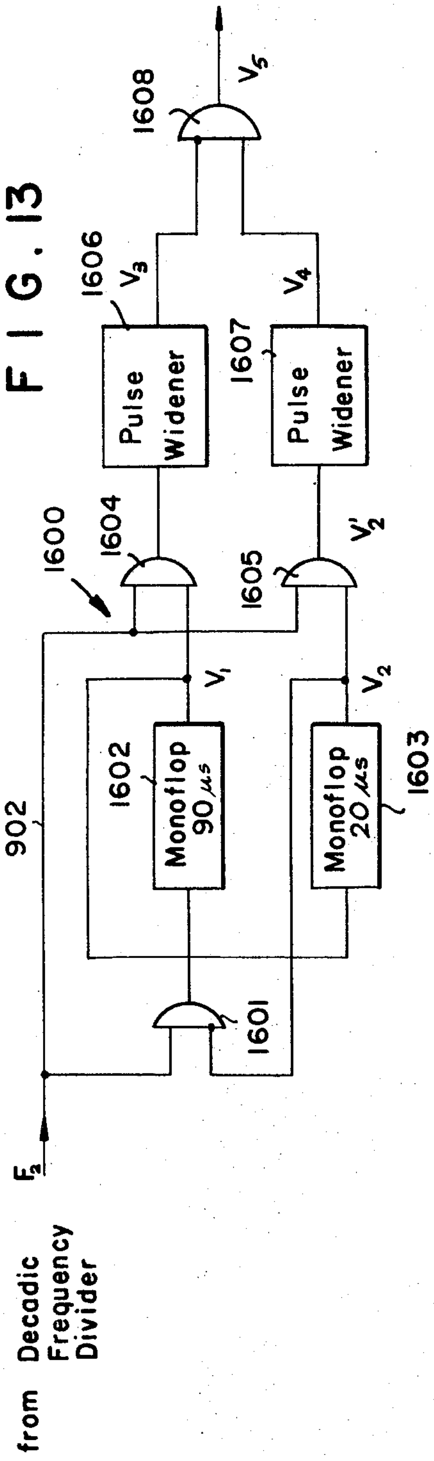
FIG. 13 shows a verification circuit for checking the periodicity of a train of service pulses illustrated in FIG. 1.
Figure 14:
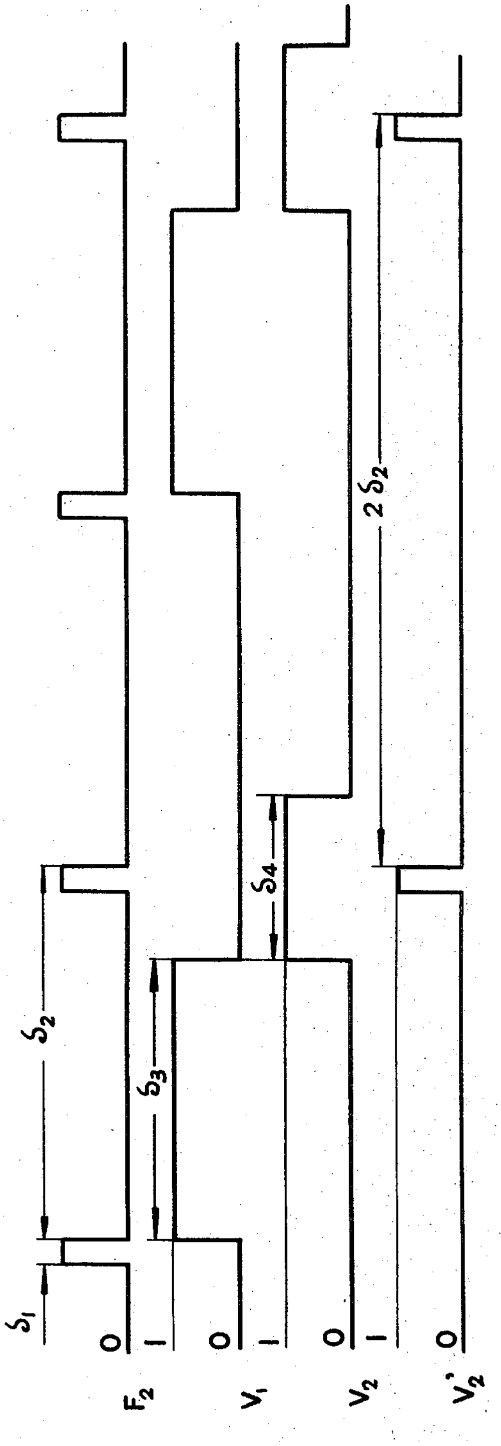
FIG. 14 is a set of graphs illustrating the pulses present in different portions of the circuit of FIG. 13.

FIGS. 13 and 14 illustrate circuitry for verifying the correct periodicity of a train of timing pulses, specifically the pulses $F_2$ on lead 902, generated by a frequency of 1 mc. of clock pulses $Ck_1$ etc. in a ratio of 1:100, generally with the use of two cascaded decadic stepdown stages. In such a system a divider stage may err by one unit of magnitude so that, in the most troublesome case, the ratio of the second stage becomes either 1:9 or 1.11 with consequent desynchronization of the system.

To avoid this source of error, we provide a verification system 1600 which includes a first AND gate 1601 receiving the pulses $F_2$, a pair of monostable multivibrators 1602, 1603 with respective operating periods $\delta_3$, $\delta_4$ of 90 $\mu$sec. and 20 $\mu$sec. connected in cascade, and two further AND gates 1604, 1605 which combine the outputs of these monoflops with the original pulses $F_2$, feeding the result through respective pulse wideners 1606, 1607 into a final AND gate 1608 with one inverting input. A feedback circuit extends from the output of monoflop 1603 to an inverting input of AND gate 1601.

In FIG. 14 we have shown the pulse train $F_2$ and the voltage pulses $V_1$, $V_2$ and $V_2'$ present in the outputs of elements 1602, 1603 and 1605, respectively. With the time constants of monoflops 1602 and 1603 equal to 0.9 $\delta_2$ and 0.2 : respectively, where $\delta_2$ is the recurrence period of pulses $F_2$ having a width $\delta_1$, voltage $V_2$ is seen to span an interval $\delta_4$ of 20 $\mu$sec. beginning at the trailing edge of pulse $V_1$ having a duration of 90 $\mu$sec., the limit of that range being thus at ($1\pm0.1$) times the normal operating period $\delta_2$. The output voltage $V_2'$ of gate 1605 is a train of pulses of the same width $\delta_1$ as pulses $F_2$ but with twice their period, i.e. a pulse interval of two $\delta_2$ (here assumed to be 200 $\mu$sec.). Naturally, other recurrent phenomena in the system of FIGS. 4—12 may be tested by the circuit arrangement shown in FIG. 13.

The output signals $V_3$, $V_4$ applied to AND gate 1608, when present, are extended by circuits 1606 and 1607 into continuous voltages. If pulse $F_2$ falls within the operating period of monoflop 1602, the output voltage $V_3$ appears; if the pulse correctly falls within the operating period of monoflop 1603, voltage $V_4$ is generated. Thus, the absence of voltage $V_3$ and the simultaneous presence of voltage $V_4$ produces the continuous output $V_5$ indicating proper pulse timing. If, however, the period of pulses $F_2$ is a multiple of its normal value, output signal $V_5$ becomes discontinuous.

The principles described in connection with FIGS. 13 and 14 may be extended to other periodically recurring phenomena within the system shown in the preceding figures, including the various pulse trains other than $F_2$ illustrated in FIGS. 1—3. It is also possible, for example, to check for the periodicity of the addresses sequentially stored in register 800, as by generating a pulse Y (FIG. 10) under the control of pulses $J_1$ and $F_3$ whenever the contents of register 800 match a specific address (e.g. 111) inscribed in phase $\Phi_3$ of memory 100.

Our invention is, of course, also applicable to telecommunication systems other than telephone exchanges, e.g. teleprinter equipment.

We claim:

1. A telecommunication system comprising an exchange; a multiplicity of stations with lines terminating at said exchange; a transmission path common to all said lines; normally open individual switch means for each line closable during a phase of a multiphase frame for connecting the corresponding line to said transmission path whereby a communication channel is established between two stations concurrently connected to said transmission path during respective phases of successive frames, the phases of each frame constituting at least one service phase and a multiplicity of communication phases; test means at said exchange for sequentially closing the switch means of consecutive lines during corresponding service phases of successive frames; voltage-detecting means operative during such service phase for ascertaining an active condition of a line thus tested; a circulating first address memory at said exchange responsive to said voltage-detecting means for temporarily storing an address of a calling station identified by said test means as associated with an active line in a recurring communication phase of successive frames; a circulating second address memory at said exchange; a circulating third memory at said exchange, all said memories having identical operating cycles each equal to a frame and a multiplicity of time slots corresponding to the phases thereof, said test means including counting means operative after each frame for progressively stepping a numerical line-identifying code inscribed in a service time slot of one of said address memories whereby codes representing the addresses of all said lines successively appear during respective frames in the output of said one of said address memories; a register connected to said output for preserving, for the duration of one frame, the address inscribed in said service time slot during an immediately preceding frame; signal-responsive means at said exchange actuatable by selection signals arriving at said transmission path from said active line for entering the address of a called station in a communication time slot of said second memory coinciding with the communication time slot of said first memory occupied by the address of said calling station; circuit means under the control of said test means for determining the activities of the lines of said calling and called stations during the progress of a call and entering corresponding code words in a time slot of said third memory coinciding with the communication time slot of said first memory occupied by the address of said calling station, said third memory being provided with output circuitry controlling the entry and cancellation of said addresses in the communication time slots of said first and second memories; and operating means responsive to the outputs of said first and second memories for closing the switch means of lines identified by addresses stored thereon in the same communication time slot.

2. A system as defined in claim 1 wherein said first memory is provided with first input circuitry under the control of said output circuitry for entering an address stored in said register in an available communication time slot of said first memory, as determined by the absence of a code word in the corresponding time slot of said third memory, upon the ascertainment of an active condition on the line identified by the stored address; said second memory being provided with second input circuitry under the control of said signal-responsive means for entering a progressively varying count in a communication time slot thereof in response to dialing pulses arriving in the same time slot during successive operating cycles.

3. A system as defined in claim 2 wherein said first and second memories each consist of a plurality of parallel memory sections for accommodating respective digits of a multidigit address; said circuit means including an evaluation unit for recognizing a train of dialing pulses and emitting an end-of-digit signal upon the termination thereof; said second input circuitry including logical gate means responsive to said end-of-digit signal for directing successive trains of dialing pulses into different sections of said second memory and for controlling said circuit means to enter a waiting code in said third memory upon inscription of a digit in a last memory section; further comprising tone-generating means under the control of said output circuitry for emitting a distinctive signal over said transmission path in the time slot occupied by the addresses of said calling and called stations in response to said waiting code.

4. A system as defined in claim 3, further comprising a busy-state indicator; first comparison means for detecting an identity between the contents of said register and an address appearing in the output of said first memory for actuating said busy-state indicator; second comparison means for detecting an identity between the contents of said register and an address appearing in the output of said second memory for controlling said circuit means to replace said waiting code in said third memory by a tentative-seizure code, and for actuating said busy-state indicator upon detection of an identity in the presence of a further code in said third memory means indicative of a more advanced state of a call involving said called station; said tone-generating means being responsive to the actuation of said busy-state indicator for emitting a busy signal over said transmission path.

5. A system as defined in claim 4 wherein said stations include local stations and terminals of trunk lines, said terminals having multidigit addresses characterized by an invariable first digit; further comprising repeating means at each of said terminals for retransmitting dialing pulses from said transmission path over the corresponding trunk line; said test means including trunk-identifying means operative during said service phase; said logical gate means being responsive to the inscription of said invariable first digit on a first section of said second memory for controlling said circuit means to enter said waiting code in said third memory prior to arrival of the next digit and for transferring the address of a trunk from said register to said communication time slot of said second memory in response to the operation of said trunk-identifying means in the presence of said waiting code on said third memory, thereby enabling said second comparison means to control said operating means for closing said switch means of the trunk line identified by said register for transmission of all further digits to said repeating means.

6. A system as defined in claim 1 wherein said exchange is provided with a plurality of substantially identical memory modules partly included in said first, second and third memories, said modules further including a standby module capable of being substituted for any active module in any of said memories; further comprising supervisory means for ascertaining a defective mode of operation of any active module and switchover means triggerable by said supervisory means for automatically substituting said standby module for an active module upon ascertainment of improper performance of the latter.

7. A system as defined in claim 6 wherein said supervisory means comprises a source of checking pulses coinciding with special service time slots of said memories, distributing means for simultaneously applying said checking pulses to corresponding inputs of a group of said active modules, and comparator means for detecting a mismatch in the outputs of the modules of said group; said switchover means comprising a logic matrix responsive to the output of said comparator means.

8. A system as defined in claim 7 wherein said group consists of three active modules, said comparator means comprising three comparators connected across respective subgroups of two of said active modules.

9. A telecommunication system comprising an exchange; a multiplicity of stations with lines terminating at said exchange; a transmission path common to all said lines; normally open individual switch means for each line momentarily closable during a phase of a multiphase frame for connecting the corresponding line to said transmission path whereby a communication channel is established between two stations concurrently connected to said transmission path during respective phases of successive frames; test means at said exchange for sequentially closing the switch means of consecutive lines during corresponding service phases of successive frames; voltage-detecting means operative during such service phase for ascertaining an active condition of a line thus tested; a first circulating memory at said exchange responsive to said voltage-detecting means for temporarily storing an address of a calling station identified by said test means as associated with an active line in a cyclically recurring communication time slot of successive operating cycles of said first memory coinciding with said frames, said test means including timer means for generating periodic pulses recurring at a predetermined cadence harmonically related to said operating cycles; a second circulating memory at said exchange having an operating cycle identical with that of said first memory and a number of time slots per cycle equaling that of said first memory and coinciding with the phases of a frame; signal-responsive means at said exchange actuatable by selection signals arriving at said transmission path from said active line for entering the address of a called station in a communication time slot of said second memory coinciding with the communication time slot of said first memory occupied by the address of said calling station; a third circulating memory at said exchange having an operating cycle and a number of time slots per cycle identical with those of said first and second memories; circuit means under the control of said test means for determining the activities of the lines of said calling and called stations during the progress of a call and entering corresponding code words in a time slot of said third memory coinciding with the communication time slot of said first memory occupied by the address of said calling station, said third memory being provided with output circuitry controlling the entry and cancellation of said addresses in the communication time slots of said first and second memories; operating means responsive to the outputs of said first and second memories for closing the switch means of lines identified by addresses stored thereon in the same communication time slot; and verification means connected to measure deviations of the recurrence rate of said periodic pulses from said cadence.

10. A system as defined in claim 9 wherein said timer means comprises a source of clock pulses of a fundamental recurrence frequency and frequency-divider means for generating said cadence as an aliquot fraction of $1/n$ of said fundamental frequency, said verification means including a time-constant network establishing a tolerance range between $1/(n-)$ and $1/(n+\alpha$¾$^{1})$ of said fundamental frequency.

11. A system as defined in claim 10 wherein said time-constant network comprises a pair of cascaded monostable multivibrators.